United States Patent
Allgaier

(10) Patent No.: US 10,437,828 B2
(45) Date of Patent: Oct. 8, 2019

(54) CONTROLLED REFERENCE PROCESS EXTENSIBILITY FRAMEWORK

(71) Applicant: SAP SE, Walldorf (DE)

(72) Inventor: Matthias Allgaier, Bernstadt (DE)

(73) Assignee: SAP SE, Walldorf (DE)

( * ) Notice: Subject to any disclaimer, the term of this patent is extended or adjusted under 35 U.S.C. 154(b) by 570 days.

(21) Appl. No.: 14/974,662

(22) Filed: Dec. 18, 2015

(65) Prior Publication Data

US 2017/0177671 A1 Jun. 22, 2017

(51) Int. Cl.
*G06F 16/2455* (2019.01)
*G06F 8/30* (2018.01)
*G06F 9/54* (2006.01)
*G06Q 10/06* (2012.01)

(52) U.S. Cl.
CPC .......... *G06F 16/24562* (2019.01); *G06F 8/30* (2013.01); *G06F 9/542* (2013.01); *G06Q 10/067* (2013.01); *G06Q 10/06316* (2013.01)

(58) Field of Classification Search
CPC ...... G06F 17/30504; G06F 8/30; G06F 9/542; G06F 16/24562; G06Q 10/06316; G06Q 10/067
See application file for complete search history.

(56) References Cited

U.S. PATENT DOCUMENTS

| | | | | |
|---|---|---|---|---|
| 8,533,660 B2 * | 9/2013 | Mehr | ......... | G06F 8/10 |
| | | | | 717/104 |
| 8,707,261 B2 * | 4/2014 | Heller | ......... | G06F 8/30 |
| | | | | 717/120 |
| 8,868,751 B2 | 10/2014 | Kylau et al. | | |
| 8,935,191 B2 | 1/2015 | Allgaier | | |
| 2007/0157159 A1 | 7/2007 | Fildebrandt et al. | | |
| 2009/0007056 A1 * | 1/2009 | Prigge | ......... | G06Q 10/10 |
| | | | | 717/104 |
| 2009/0216731 A1 * | 8/2009 | Markovic | ......... | G06Q 10/10 |

(Continued)

OTHER PUBLICATIONS

Communication re extended European Search Report for related EP Appl. No. 16002561.5-1952 dated May 15, 2017; 9 pages.

(Continued)

*Primary Examiner* — Mark D Featherstone
*Assistant Examiner* — Faezeh Forouharnejad
(74) *Attorney, Agent, or Firm* — Fish & Richardson P.C.

(57) ABSTRACT

The disclosure generally describes computer-implemented methods, software, and systems, including a method for querying extension point information and providing extension patterns for core process models. Information for a core process model user interface is provided to a client device for displaying a core process model as a visualization including core process model steps and dedicated extension points for inserting user-defined extensions. The information is provided by a server from a core process model metamodel. Selections of the extension points and customization of extensions associated with the extension points are received from a client device. A core process model instance including the core process model and customizations of the extensions is stored. Information is provided for use at the client device for presenting a process extension query interface. A query is received from the client device. Query results are identified and provided for presentation in the process extension query interface.

15 Claims, 30 Drawing Sheets

(56) References Cited

U.S. PATENT DOCUMENTS

| | | | |
|---|---|---|---|
| 2012/0323618 A1 | 12/2012 | Allgaier et al. | |
| 2012/0330699 A1 | 12/2012 | Allgaier | |
| 2013/0262504 A1 | 10/2013 | Allgaier | |
| 2013/0297544 A1 | 11/2013 | Allgaier et al. | |
| 2014/0137079 A1 | 5/2014 | Witteborg et al. | |
| 2015/0347749 A1* | 12/2015 | Kiehtreiber | G06F 21/53 726/26 |

OTHER PUBLICATIONS

Communication re extended European Search Report for related EP Appl. No. 16002562.5-1954 dated May 29, 2017; 8 pages.
Jian Yu et al. "Pattern Based Property Specification and Verification for Service Composition", Oct. 23, 2006; WEB Information Systems—Wise 2006 Lecture Notes in Computer Science; LNCS, Springer, Berlin, DE, pp. 156-168 (XP019047514.
Ahmed Awad et al. "Efficient Compliance Checking Using BPMN-Q and Temporal Logic", Sep. 2, 2008; Business Process Management; Lecture Notices in Computer Science; Springer, Berlin, DE, pp. 326-341 (XP019103954).

* cited by examiner

| BPMN Enhancements for Controlled Process Extensibility | | | |
|---|---|---|---|
| Process Type | Element | Visualization | Description |
| Core Process 410 | Outbound Extension Point 402 | (EP) | Event that allows a core process to send data to an extension process. It is modelled as a specific BPMN throw event. |
| | Inbound Extension Point 404 | (EP) | Event that allows a core process to receive data from an extension process. It is modelled as a specific BPMN catch event. |
| Extension Process 412 | Inbound Connection Point 406 | (CP) | Event that allows an extension process to receive data from a core process. It is modelled as a specific BPMN catch event. |
| | Outbound Extension Point 408 | (CP) | Event that allows an extension process to send data to a core process. It is modelled as a specific BPMN throw event. |

FIG. 4

```
1   <?xml version="1.0" encoding="UTF-8"?>
2
3   <!DOCTYPE rdf:RDF [
4       <!ENTITY xmi "http://www.omg.org/XMI" >
5           <!ENTITY ed_bpmn "http://stp.eclipse.org/bpmn" >
6       <!ENTITY bpmn "http://www.omg.org/BPMN2.0#" >
7       <!ENTITY owl "http://www.w3.org/2002/07/owl#" >
8       <!ENTITY swrl "http://www.w3.org/2003/11/swrl#" >
9       <!ENTITY swrlb "http://www.w3.org/2003/11/swrlb#" >
10      <!ENTITY xsd "http://www.w3.org/2001/XMLSchema#" >
11      <!ENTITY rdfs "http://www.w3.org/2000/01/rdf-schema#" >
12      <!ENTITY rdf "http://www.w3.org/1999/02/22-rdf-syntax-ns#" >
13      <!ENTITY protege "http://protege.stanford.edu/plugins/owl/protege#" >
14      <!ENTITY xsp "http://www.owl-ontologies.com/2005/08/07/xsp.owl#" >
15  <!ENTITY ex "http://www.sap.com/research/texo/sif/aed/extensions#" >
16  ]>
17
18  <rdf:RDF xmlns=http://www.sap.com/research/texo/sif/aed#
19      xml:base="http://www.sap.com/research/texo/sif/aed/BPMN_Ontology/_ID"
20      xmlns:rdfs="http://www.w3.org/2000/01/rdf-schema#"
21      xmlns:ex="http://www.sap.com/research/texo/sif/aed/extensions#"
22      xmlns:swrl="http://www.w3.org/2003/11/swrl#"
23      xmlns:protege="http://protege.stanford.edu/plugins/owl/protege#"
24      xmlns:ed_bpmn="http://stp.eclipse.org/bpmn"
25      xmlns:xsp="http://www.owl-ontologies.com/2005/08/07/xsp.owl#"
26      xmlns:swrlb="http://www.w3.org/2003/11/swrlb#"
27      xmlns:xsd="http://www.w3.org/2001/XMLSchema#"
28      xmlns:owl="http://www.w3.org/2002/07/owl#"
29      xmlns:rdf="http://www.w3.org/1999/02/22-rdf-syntax-ns#"
30      xmlns:xmi="http://www.omg.org/XMI"
31      xmlns:bpmn="http://www.omg.org/BPMN2.0#">
32      <owl:Ontology rdf:about=""/>
33      <bpmn:SequenceFlow rdf:ID="_4m6rYVqqEeKz3n6mBTlWw">
34          <bpmn:has_incoming_ref rdf:resource="#_Rb8L0VqnEeKMBl4WEapfTw"/>
35          <bpmn:has_outgoing_ref rdf:resource="#_4muelVqqEeKz3n6mBTlWw"/>
36      </bpmn:SequenceFlow>
37      <bpmn:Task rdf:ID="_4muelVqqEeKz3n6mBTlWw">
38          <bpmn:has_incoming_ref rdf:resource="#_4m6rYVqqEeKz3n6mBTlWw"/>
39          <bpmn:has_name rdf:datatype="&xsd;string">T6</bpmn:has_name>
40          <bpmn:has_outgoing_ref rdf:resource="#_6STPlVqqEeKz3n6mBTlWw"/>
```

FIG. 7E

```
41      </bpmn:Task>
42      <bpmn:SequenceFlow rdf:ID="_6STPlVqqEeKz3ri6mBTlWw">
43          <bpmn:has_incoming_ref rdf:resource="#_4muelVqqEeKz3ri6mBTlWw"/>
44          <bpmn:has_outgoing_ref rdf:resource="#_Tz1FcVqnEeKMBl4WEapfTw"/>
45      </bpmn:SequenceFlow>
46      <bpmn:SequenceFlow rdf:ID="_c33ZlVqkEeKMBl4WEapfTw">
47          <bpmn:has_incoming_ref rdf:resource="#_crd74VqkEeKMBl4WEapfTw"/>
48          <bpmn:has_outgoing_ref rdf:resource="#_ZEAlAVqkEeKMBl4WEapfTw"/>
49      </bpmn:SequenceFlow>
50      <bpmn:StartEvent rdf:ID="_crd74VqkEeKMBl4WEapfTw">
51          <bpmn:has_name rdf:datatype="&xsd;string">Start</bpmn:has_name>
52          <bpmn:has_outgoing_ref rdf:resource="#_c33ZlVqkEeKMBl4WEapfTw"/>
53      </bpmn:StartEvent>
54      <bpmn:IntermediateThrowEvent rdf:ID="_fc2eYVqkEeKMBl4WEapfTw">
55          <bpmn:has_event_definition_ref
56              rdf:resource="#_fc2eYVqkEeKMBl4WEapfTwEventDefinition"/>
57          <bpmn:has_incoming_ref rdf:resource="#_JH8LoVqkEeKMBl4WEapfTw"/>
58          <bpmn:has_name rdf:datatype="&xsd;string">EP-1</bpmn:has_name>
59          <bpmn:has_outgoing_ref rdf:resource="#_h41GsVqnEeKMBl4WEapfTw"/>
60      </bpmn:IntermediateThrowEvent>
61      <ex:Constraint rdf:ID="_fc2eYVqkEeKMBl4WEapfTwConstraint">
62          <ex:has_constraint_expr rdf:datatype="&xsd;string"
63              >ConstraintExpression</ex:has_constraint_expr>
64          <ex:has_language rdf:datatype="&xsd;string"
65              >ConstraintLanguage</ex:has_language>
66      </ex:Constraint>
67      <ex:EPEventDefinition rdf:ID="_fc2eYVqkEeKMBl4WEapfTwEventDefinition">
68          <ex:has_activation_status
69              rdf:datatype="&xsd;boolean">true</ex:has_activation_status>
70          <ex:has_branching_type
71              rdf:datatype="&xsd;string">PARALLEL</ex:has_branching_type>
72          <ex:has_constraint rdf:resource="#_fc2eYVqkEeKMBl4WEapfTwConstraint"/>
73          <ex:has_core_process_ref rdf:resource="#_ZDoSgVqkEeKMBl4WEapfTwProcess"/>
74          <ex:has_execution_type rdf:datatype="&xsd;string">ASYNCHRONOUS</ex:has_execution_type>
75          <ex:has_group rdf:datatype="&xsd;positiveInteger">1</ex:has_group>
76          <ex:has_max_number_of_processes rdf:datatype="&xsd;int">1</ex:has_max_number_of_processes>
77          <ex:has_version rdf:datatype="&xsd;float">1.0</ex:has_version>
78      </ex:EPEventDefinition>
79      <bpmn:SequenceFlow rdf:ID="_FV_j4VqnEeKMBl4WEapfTw">
```

FIG. 7F

```
80      <bpmn:has_incoming_ref rdf:resource="#_nYo-UVqmEeKMBf4WEaptTw"/>
81      <bpmn:has_outgoing_ref rdf:resource="#_pplaQVqmEeKMBf4WEaptTw"/>
82  </bpmn:SequenceFlow>
83  <bpmn:SequenceFlow rdf:ID="_h41GsVqmEeKMBf4WEaptTw">
84      <bpmn:has_incoming_ref rdf:resource="#_fc2eYVqkEeKMBf4WEaptTw"/>
85      <bpmn:has_outgoing_ref rdf:resource="#_hPWE0VqmEeKMBf4WEaptTw"/>
86  </bpmn:SequenceFlow>
87  <bpmn:ExclusiveGateway rdf:ID="_hPWE0VqmEeKMBf4WEaptTw">
88      <bpmn:has_incoming_ref rdf:resource="#_h41GsVqmEeKMBf4WEaptTw"/>
89      <bpmn:has_outgoing_ref rdf:resource="#_inj08VqmEeKMBf4WEaptTw"/>
90      <bpmn:has_outgoing_ref rdf:resource="#_kqNpMVqmEeKMBf4WEaptTw"/>
91  </bpmn:ExclusiveGateway>
92  <bpmn:SequenceFlow rdf:ID="_iH8LoVqkEeKMBf4WEaptTw">
93      <bpmn:has_incoming_ref rdf:resource="#_ZEAtAVqkEeKMBf4WEaptTw"/>
94      <bpmn:has_outgoing_ref rdf:resource="#_fc2eYVqkEeKMBf4WEaptTw"/>
95  </bpmn:SequenceFlow>
96  <bpmn:Task rdf:ID="_induUVqmEeKMBf4WEaptTw">
97      <bpmn:has_incoming_ref rdf:resource="#_inj08VqmEeKMBf4WEaptTw"/>
98      <bpmn:has_name rdf:datatype="&xsd;string">T2</bpmn:has_name>
99      <bpmn:has_outgoing_ref rdf:resource="#_obN1oVqmEeKMBf4WEaptTw"/>
100 </bpmn:Task>
101 <bpmn:SequenceFlow rdf:ID="_inj08VqmEeKMBf4WEaptTw">
102     <bpmn:has_incoming_ref rdf:resource="#_hPWE0VqmEeKMBf4WEaptTw"/>
103     <bpmn:has_outgoing_ref rdf:resource="#_induUVqmEeKMBf4WEaptTw"/>
104 </bpmn:SequenceFlow>
105 <bpmn:SequenceFlow rdf:ID="_JNeKwVqnEeKMBf4WEaptTw">
106     <bpmn:has_incoming_ref rdf:resource="#_pplaQVqmEeKMBf4WEaptTw"/>
107     <bpmn:has_outgoing_ref rdf:resource="#_JNR9gVqnEeKMBf4WEaptTw"/>
108 </bpmn:SequenceFlow>
109 <bpmn:Task rdf:ID="_JNR9gVqnEeKMBf4WEaptTw">
110     <bpmn:has_incoming_ref rdf:resource="#_JNeKwVqnEeKMBf4WEaptTw"/>
111     <bpmn:has_name rdf:datatype="&xsd;string">T3</bpmn:has_name>
112     <bpmn:has_outgoing_ref rdf:resource="#_MyctYVqmEeKMBf4WEaptTw"/>
113 </bpmn:Task>
114 <bpmn:SequenceFlow rdf:ID="_KQa1gVqnEeKMBf4WEaptTw">
115     <bpmn:has_incoming_ref rdf:resource="#_pplaQVqmEeKMBf4WEaptTw"/>
116     <bpmn:has_outgoing_ref rdf:resource="#_KQUu4VqnEeKMBf4WEaptTw"/>
117 </bpmn:SequenceFlow>
118 <bpmn:Task rdf:ID="_kqHikVqmEeKMBf4WEaptTw">
119     <bpmn:has_incoming_ref rdf:resource="#_kqNpMVqmEeKMBf4WEaptTw"/>
```

FIG. 7G

```
120            <bpmn:has_name rdf:datatype="&xsd;string">T5</bpmn:has_name>
121            <bpmn:has_outgoing_ref rdf:resource="#_SkxRUVqnEeKMBI4WEaptTw"/>
122        </bpmn:Task>
123        <bpmn:SequenceFlow rdf:ID="_kqNpMVqnEeKMBI4WEaptTw">
124            <bpmn:has_incoming_ref rdf:resource="#_hPWE0VqnEeKMBI4WEaptTw"/>
125            <bpmn:has_outgoing_ref rdf:resource="#_kqHkVqnEeKMBI4WEaptTw"/>
126        </bpmn:SequenceFlow>
127        <bpmn:Task rdf:ID="_KQUu4VqnEeKMBI4WEaptTw">
128            <bpmn:has_incoming_ref rdf:resource="#_KQa1gVqnEeKMBI4WEaptTw"/>
129            <bpmn:has_name rdf:datatype="&xsd;string">T4</bpmn:has_name>
130            <bpmn:has_outgoing_ref rdf:resource="#_NDuDkVqnEeKMBI4WEaptTw"/>
131        </bpmn:Task>
132        <bpmn:IntermediateThrowEvent rdf:ID="_m770MVqnEeKMBI4WEaptTw">
133            <bpmn:has_event_definition_ref rdf:resource="#_m770MVqnEeKMBI4WEaptTwEventDefinition"/>
134            <bpmn:has_incoming_ref rdf:resource="#_dbN1oVqnEeKMBI4WEaptTw"/>
135            <bpmn:has_name rdf:datatype="&xsd;string">EP-2</bpmn:has_name>
136            <bpmn:has_outgoing_ref rdf:resource="#_orJlAVqnEeKMBI4WEaptTw"/>
137        </bpmn:IntermediateThrowEvent>
138        <ex:Constraint rdf:ID="_m770MVqnEeKMBI4WEaptTwConstraint">
139            <ex:has_constraint_expr rdf:datatype="&xsd;string"
140                >ConstraintExpression</ex:has_constraint_expr>
141            <ex:has_language rdf:datatype="&xsd;string"
142                >ConstraintLanguage</ex:has_language>
143        </ex:Constraint>
144        <ex:EPEventDefinition rdf:ID="_m770MVqnEeKMBI4WEaptTwEventDefinition">
145            <ex:has_activation_status
146                rdf:datatype="&xsd;boolean">true</ex:has_activation_status>
147            <ex:has_branching_type
148                rdf:datatype="&xsd;string">PARALLEL</ex:has_branching_type>
149            <ex:has_constraint rdf:resource="#_m770MVqnEeKMBI4WEaptTwConstraint"/>
150            <ex:has_core_process_ref rdf:resource="#_ZDoSgVqkEeKMBI4WEaptTwProcess"/>
151            <ex:has_execution_type rdf:datatype="&xsd;string">ASYNCHRONOUS</ex:has_execution_type>
152            <ex:has_group rdf:datatype="&xsd;positiveInteger">1</ex:has_group>
153            <ex:has_max_number_of_processes rdf:datatype="&xsd;int">1</ex:has_max_number_of_processes>
154            <ex:has_version rdf:datatype="&xsd;float">1.0</ex:has_version>
155        </ex:EPEventDefinition>
156        <bpmn:ParallelGateway rdf:ID="_MjqqgVqnEeKMBI4WEaptTw">
157            <bpmn:has_incoming_ref rdf:resource="#_MycfYVqnEeKMBI4WEaptTw"/>
158            <bpmn:has_incoming_ref rdf:resource="#_NDuDkVqnEeKMBI4WEaptTw"/>
```

FIG. 7H

```
159            <bpmn:has_outgoing_ref rdf:resource="#_SDS78VqnEeKMBI4WEaptTw"/>
160        </bpmn:ParallelGateway>
161        <bpmn:SequenceFlow rdf:ID="_MycfYVqnEeKMBI4WEaptTw">
162            <bpmn:has_incoming_ref rdf:resource="#_JNRSgVqnEeKMBI4WEaptTw"/>
163            <bpmn:has_outgoing_ref rdf:resource="#_MjqqgVqnEeKMBI4WEaptTw"/>
164        </bpmn:SequenceFlow>
165        <bpmn:SequenceFlow rdf:ID="_NDuOkVqnEeKMBI4WEaptTw">
166            <bpmn:has_incoming_ref rdf:resource="#_KQUu4VqnEeKMBI4WEaptTw"/>
167            <bpmn:has_outgoing_ref rdf:resource="#_MjqqgVqnEeKMBI4WEaptTw"/>
168        </bpmn:SequenceFlow>
169        <bpmn:IntermediateCatchEvent rdf:ID="_nYo-UVqnEeKMBI4WEaptTw">
170            <bpmn:has_event_definition_ref
171                rdf:resource="#_nYo-UVqnEeKMBI4WEaptTwEventDefinition"/>
172            <bpmn:has_incoming_ref rdf:resource="#_orJIAVqnEeKMBI4WEaptTw"/>
173            <bpmn:has_name rdf:datatype="&xsd;string">EP-3</bpmn:has_name>
174            <bpmn:has_outgoing_ref rdf:resource="#_PV_i4VqnEeKMBI4WEaptTw"/>
175        </bpmn:IntermediateCatchEvent>
176        <ex:Constraint rdf:ID="_nYo-UVqnEeKMBI4WEaptTwConstraint">
177            <ex:has_constraint_expr rdf:datatype="&xsd;string"
178                >ConstraintExpression</ex:has_constraint_expr>
179            <ex:has_language rdf:datatype="&xsd;string"
180                >ConstraintLanguage</ex:has_language>
181        </ex:Constraint>
182        <ex:EPEventDefinition rdf:ID="_nYo-UVqnEeKMBI4WEaptTwEventDefinition">
183            <ex:has_activation_status
184                rdf:datatype="&xsd;boolean">true</ex:has_activation_status>
185            <ex:has_branching_type
186                rdf:datatype="&xsd;string">PARALLEL</ex:has_branching_type>
187            <ex:has_constraint rdf:resource="#_nYo-UVqnEeKMBI4WEaptTwConstraint"/>
188            <ex:has_core_process_ref rdf:resource="#_ZDoSgVqkEeKMBI4WEaptTwProcess"/>
189            <ex:has_execution_type rdf:datatype="&xsd;string">ASYNCHRONOUS</ex:has_execution_type>
190            <ex:has_group rdf:datatype="&xsd;positiveInteger">1</ex:has_group>
191            <ex:has_max_number_of_processes rdf:datatype="&xsd;int">1</ex:has_max_number_of_processes>
192            <ex:has_version rdf:datatype="&xsd;float">1.0</ex:has_version>
193        </ex:EPEventDefinition>
194        <bpmn:SequenceFlow rdf:ID="_obN1oVqnEeKMBI4WEaptTw">
195            <bpmn:has_incoming_ref rdf:resource="#_induUVqnEeKMBI4WEaptTw"/>
196            <bpmn:has_outgoing_ref rdf:resource="#_m77OMVqnEeKMBI4WEaptTw"/>
197        </bpmn:SequenceFlow>
```

FIG. 7I

```
198   <bpmn:SequenceFlow rdf:ID="_orJlAVqnEeKMBf4WEaptTw">
199       <bpmn:has_incoming_ref rdf:resource="#_m77OMVqnEeKMBf4WEaptTw"/>
200       <bpmn:has_outgoing_ref rdf:resource="#_nYo-UVqnEeKMBf4WEaptTw"/>
201   </bpmn:SequenceFlow>
202   <bpmn:ParallelGateway rdf:ID="_ppiaQVqnEeKMBf4WEaptTw">
203       <bpmn:has_incoming_ref rdf:resource="#_FV_j4VqnEeKMBf4WEaptTw"/>
204       <bpmn:has_outgoing_ref rdf:resource="#_JNeKwVqnEeKMBf4WEaptTw"/>
205       <bpmn:has_outgoing_ref rdf:resource="#_KQa1gVqnEeKMBf4WEaptTw"/>
206   </bpmn:ParallelGateway>
207   <bpmn:ExclusiveGateway rdf:ID="_Rb8L0VqnEeKMBf4WEaptTw">
208       <bpmn:has_incoming_ref rdf:resource="#_SDS78VqnEeKMBf4WEaptTw"/>
209       <bpmn:has_incoming_ref rdf:resource="#_V78MAVqpEeKz3n6mBTlWw"/>
210       <bpmn:has_outgoing_ref rdf:resource="#_4m8rYVqpEeKz3n6mBTlWw"/>
211   </bpmn:ExclusiveGateway>
212   <bpmn:SequenceFlow rdf:ID="_SDS78VqnEeKMBf4WEaptTw">
213       <bpmn:has_incoming_ref rdf:resource="#_MjqqgVqnEeKMBf4WEaptTw"/>
214       <bpmn:has_outgoing_ref rdf:resource="#_Rb8L0VqnEeKMBf4WEaptTw"/>
215   </bpmn:SequenceFlow>
216   <bpmn:SequenceFlow rdf:ID="_SkxRUVqnEeKMBf4WEaptTw">
217       <bpmn:has_incoming_ref rdf:resource="#_kqHikVqnEeKMBf4WEaptTw"/>
218       <bpmn:has_outgoing_ref rdf:resource="#_UsMbYVqpEeKz3n6mBTlWw"/>
219   </bpmn:SequenceFlow>
220   <bpmn:IntermediateThrowEvent rdf:ID="_Tz1FcVqnEeKMBf4WEaptTw">
221       <bpmn:has_event_definition_ref rdf:resource="#_Tz1FcVqnEeKMBf4WEaptTwEventDefinition"/>
222       <bpmn:has_incoming_ref rdf:resource="#_6STPlVqpEeKz3n6mBTlWw"/>
223       <bpmn:has_name rdf:datatype="&xsd;string">EP-5</bpmn:has_name>
224       <bpmn:has_outgoing_ref rdf:resource="#_VgEk0VqnEeKMBf4WEaptTw"/>
225   </bpmn:IntermediateThrowEvent>
226   <ex:Constraint rdf:ID="_Tz1FcVqnEeKMBf4WEaptTwConstraint">
227       <ex:has_constraint_expr rdf:datatype="&xsd;string"
228           >ConstraintExpression</ex:has_constraint_expr>
229       <ex:has_language rdf:datatype="&xsd;string"
230           >ConstraintLanguage</ex:has_language>
231   </ex:Constraint>
232   <ex:EPEventDefinition rdf:ID="_Tz1FcVqnEeKMBf4WEaptTwEventDefinition">
233       <ex:has_activation_status
234           rdf:datatype="&xsd;boolean">true</ex:has_activation_status>
235       <ex:has_branching_type
236           rdf:datatype="&xsd;string">PARALLEL</ex:has_branching_type>
237       <ex:has_constraint rdf:resource="#_Tz1FcVqnEeKMBf4WEaptTwConstraint"/>
```

FIG. 7J

```
238         <ex:has_core_process_ref rdf:resource="#_ZDoSgVqkEeKMBf4WEaptTw:Process"/>
239         <ex:has_execution_type rdf:datatype="&xsd;string">ASYNCHRONOUS</ex:has_execution_type>
240         <ex:has_group rdf:datatype="&xsd;positiveInteger">1</ex:has_group>
241         <ex:has_max_number_of_processes rdf:datatype="&xsd;int">1</ex:has_max_number_of_processes>
242         <ex:has_version rdf:datatype="&xsd;float">1.0</ex:has_version>
243     </ex:EPEventDefinition>
244     <bpmn:IntermediateCatchEvent rdf:ID="_UsMbYVqoEeKz3ri6mBTIWw">
245         <bpmn:has_event_definition_ref rdf:resource="#_UsMbYVqoEeKz3ri6mBTIWwEventDefinition"/>
246         <bpmn:has_incoming_ref rdf:resource="#_SkxRUVqnEeKMBf4WEaptTw"/>
247         <bpmn:has_name rdf:datatype="&xsd;string">EP-4</bpmn:has_name>
248         <bpmn:has_outgoing_ref rdf:resource="#_V78MAVqoEeKz3ri6mBTIWw"/>
249     </bpmn:IntermediateCatchEvent>
250     <ex:Constraint rdf:ID="_UsMbYVqoEeKz3ri6mBTIWwConstraint">
251         <ex:has_constraint_expr rdf:datatype="&xsd;string"
252             >ConstraintExpression</ex:has_constraint_expr>
253         <ex:has_language rdf:datatype="&xsd;string"
254             >ConstraintLanguage</ex:has_language>
255     </ex:Constraint>
256     <ex:EPEventDefinition rdf:ID="_UsMbYVqoEeKz3ri6mBTIWwEventDefinition">
257         <ex:has_activation_status
258             rdf:datatype="&xsd;boolean">true</ex:has_activation_status>
259         <ex:has_branching_type
260             rdf:datatype="&xsd;string">PARALLEL</ex:has_branching_type>
261         <ex:has_constraint rdf:resource="#_UsMbYVqoEeKz3ri6mBTIWwConstraint"/>
262         <ex:has_core_process_ref rdf:resource="#_ZDoSgVqkEeKMBf4WEaptTw:Process"/>
263         <ex:has_execution_type rdf:datatype="&xsd;string">ASYNCHRONOUS</ex:has_execution_type>
264         <ex:has_group rdf:datatype="&xsd;positiveInteger">1</ex:has_group>
265         <ex:has_max_number_of_processes rdf:datatype="&xsd;int">1</ex:has_max_number_of_processes>
266         <ex:has_version rdf:datatype="&xsd;float">1.0</ex:has_version>
267     </ex:EPEventDefinition>
268     <bpmn:SequenceFlow rdf:ID="_V78MAVqoEeKz3ri6mBTIWw">
269         <bpmn:has_incoming_ref rdf:resource="#_UsMbYVqoEeKz3ri6mBTIWw"/>
270         <bpmn:has_outgoing_ref rdf:resource="#_Rb6L0VqnEeKMBf4WEaptTw"/>
271     </bpmn:SequenceFlow>
272     <bpmn:EndEvent rdf:ID="_Vf-eMVqnEeKMBf4WEaptTw">
273         <bpmn:has_incoming_ref rdf:resource="#_VgEk0VqnEeKMBf4WEaptTw"/>
274         <bpmn:has_name rdf:datatype="&xsd;string">End</bpmn:has_name>
275     </bpmn:EndEvent>
```

FIG. 7K

```
276   <bpmn:SequenceFlow rdf:ID="_VgEk0VqnEeKMBl4WEaptTw">
277       <bpmn:has_incoming_ref rdf:resource="#_Tz1FcVqnEeKMBl4WEaptTw"/>
278       <bpmn:has_outgoing_ref rdf:resource="#_Vf-eMVqnEeKMBl4WEaptTw"/>
279   </bpmn:SequenceFlow>
280   <bpmn:Participant rdf:ID="_ZDoSgVqkEeKMBl4WEaptTw">
281       <bpmn:has_name rdf:datatype="&xsd;string">CP1</bpmn:has_name>
282       <bpmn:has_process_ref rdf:resource="#_ZDoSgVqkEeKMBl4WEaptTwProcess"/>
283   </bpmn:Participant>
284   <bpmn:Process rdf:ID="_ZDoSgVqkEeKMBl4WEaptTwProcess">
285       <bpmn:has_flow_element rdf:resource="#_4m6rYVqgEeKz3n6mBTlWw"/>
286       <bpmn:has_flow_element rdf:resource="#_4muelVqgEeKz3n6mBTlWw"/>
287       <bpmn:has_flow_element rdf:resource="#_6STPlVqgEeKz3n6mBTlWw"/>
288       <bpmn:has_flow_element rdf:resource="#_c33ZlVqkEeKMBl4WEaptTw"/>
289       <bpmn:has_flow_element rdf:resource="#_cxl74VqkEeKMBl4WEaptTw"/>
290       <bpmn:has_flow_element rdf:resource="#_fc2eYVqkEeKMBl4WEaptTw"/>
291       <bpmn:has_flow_element rdf:resource="#_FV_i4VqnEeKMBl4WEaptTw"/>
292       <bpmn:has_flow_element rdf:resource="#_h4lGsVqnEeKMBl4WEaptTw"/>
293       <bpmn:has_flow_element rdf:resource="#_hPWE0VqnEeKMBl4WEaptTw"/>
294       <bpmn:has_flow_element rdf:resource="#_iH8LoVqkEeKMBl4WEaptTw"/>
295       <bpmn:has_flow_element rdf:resource="#_induUVqnEeKMBl4WEaptTw"/>
296       <bpmn:has_flow_element rdf:resource="#_inj08VqnEeKMBl4WEaptTw"/>
297       <bpmn:has_flow_element rdf:resource="#_JNeKwVqnEeKMBl4WEaptTw"/>
298       <bpmn:has_flow_element rdf:resource="#_JNR9gVqnEeKMBl4WEaptTw"/>
299       <bpmn:has_flow_element rdf:resource="#_KQa1gVqnEeKMBl4WEaptTw"/>
300       <bpmn:has_flow_element rdf:resource="#_kqHikVqnEeKMBl4WEaptTw"/>
301       <bpmn:has_flow_element rdf:resource="#_kqNpMVqnEeKMBl4WEaptTw"/>
302       <bpmn:has_flow_element rdf:resource="#_KQUu4VqnEeKMBl4WEaptTw"/>
303       <bpmn:has_flow_element rdf:resource="#_m77oMVqnEeKMBl4WEaptTw"/>
304       <bpmn:has_flow_element rdf:resource="#_MjqqgVqnEeKMBl4WEaptTw"/>
305       <bpmn:has_flow_element rdf:resource="#_MyctYVqnEeKMBl4WEaptTw"/>
306       <bpmn:has_flow_element rdf:resource="#_NDuOkVqnEeKMBl4WEaptTw"/>
307       <bpmn:has_flow_element rdf:resource="#_nYo-UVqnEeKMBl4WEaptTw"/>
308       <bpmn:has_flow_element rdf:resource="#_obN1oVqnEeKMBl4WEaptTw"/>
309       <bpmn:has_flow_element rdf:resource="#_oxJlAVqnEeKMBl4WEaptTw"/>
310       <bpmn:has_flow_element rdf:resource="#_ppIaQVqnEeKMBl4WEaptTw"/>
311       <bpmn:has_flow_element rdf:resource="#_Rb6L0VqnEeKMBl4WEaptTw"/>
312       <bpmn:has_flow_element rdf:resource="#_SOS78VqnEeKMBl4WEaptTw"/>
313       <bpmn:has_flow_element rdf:resource="#_SkxRUVqnEeKMBl4WEaptTw"/>
314       <bpmn:has_flow_element rdf:resource="#_Tz1FcVqnEsKMBl4WEaptTw"/>
315       <bpmn:has_flow_element rdf:resource="#_UsMbYVqgEeKz3n6mBTlWw"/>
```

FIG. 7L

```
316        <bpmn:has_flow_element rdf:resource="#_V78MAVqpEeKz3ri6mBTlWw"/>
317        <bpmn:has_flow_element rdf:resource="#_Vf-eMVqnEeKMBf4WEaptTw"/>
318        <bpmn:has_flow_element rdf:resource="#_VgEk0VqnEeKMBf4WEaptTw"/>
319        <bpmn:has_flow_element rdf:resource="#_ZEAlAVqkEeKMBf4WEaptTw"/>
320        <bpmn:has_name rdf:datatype="&xsd;string">CP1</bpmn:has_name>
321     </bpmn:Process>
322     <bpmn:Task rdf:ID="_ZEAlAVqkEeKMBf4WEaptTw">
323        <bpmn:has_incoming_ref rdf:resource="#_c33ZlVqkEeKMBf4WEaptTw"/>
324        <bpmn:has_name rdf:datatype="&xsd;string">T1</bpmn:has_name>
325        <bpmn:has_outgoing_ref rdf:resource="#_jH8LoVqkEeKMBf4WEaptTw"/>
326     </bpmn:Task>
327  </rdf:RDF>
```

| BPMNQuery:Retrieve all extension points with the specified properties (=outbound extension point) that are between the two specified elements (=between task T1 and T6). |
|---|
| Java Query API |

```
1   //Instantiate core process query module with BPMN Ontology
2   CPQueryModule engine = new CPQueryModule ("Core Process 1.owl");
3
4   //Create query template objects
5   ExtensionPoint epTemplate = new ExtensionPoint();
6   epTemplate.setType (EPType.OUT);
7
8   Task startTemplate = new Task();
9   startTemplate.setName("T1");
10
11  Task endTemplate = new Task();
12  endTemplate.setName("T6");
13
14  //Execute query and process results
15  List<ExtensionPoint> result = engine.getExtensionPointsBetween
16                              (epTemplate, startTemplate, endTemplate);
17  Iterator x = result.iterator();
```
— 902

| Generated SPARQL Query |
|---|

```
1   PREFIX rdf:<http://www.w3.org/1999/02/22-rdf-syntax-ns#>
2   PREFIX bpmn:<http://www.omg.org/BPMN2.0#>
3   PREFIX ex:<http://www.sap.com/research/texo/cape/extensions#>
4   PREFIX xsd:<http://www.w3.org/2001/XMLSchema#>
5   SELECT ?extensionPoint1 ?task1 ?task2 ?extensionPoint1ED
6   WHERE {
7       ?extensionPoint1 rdf:type bpmn:ThrowEvent .
8       ?extensionPoint1 bpmn:has_event_definition_ref ?extensionPoint1ED .
9       ?extensionPoint1ED rdf:type ex:EPEventDefinition .
10      ?extensionPoint1 bpmn:has_incoming_ref ?task1 .
11      ?task1 rdf:type bpmn:Task .
12      ?task1 bpmn:has_name 'T1'^^xsd:string .
13      ?task1 bpmn:has_outgoing_ref ?extensionPoint1 .
14      ?extensionPoint1 bpmn:has_outgoing_ref ?task2 .
15      ?task2 rdf:type bpmn:Task .
16      ?task2 bpmn:has_name 'T6'^^xsd:string .
17      ?task2 bpmn:has_incoming_ref ?extensionPoint1
18  }
```
— 904

| Query Example |
|---|

INPUT: Core Process1.bpmn  OUTPUT: 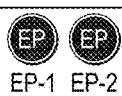 EP-1  EP-2

1000

1100

1200

1300

1400

1500

CONTROLLED REFERENCE PROCESS EXTENSIBILITY FRAMEWORK

CROSS-REFERENCE TO RELATED APPLICATIONS

This application is a application of U.S. application Ser. No. 14/974,713, filed on Dec. 18, 2015 entitled "SOFTWARE-AS-A-SERVICE REFERENCE PROCESS EXTENSION VERIFICATION FRAMEWORK" the entire contents of which are incorporated herein by reference.

BACKGROUND

The present disclosure relates to using and querying information associated with extensions for core process models.

Most enterprise systems that include software components associated with core process model definition/use can provide various levels of adaptation capabilities. Typical systems, however, may not support controlled mechanisms for defining and using extensions associated with reference core process models. Documentation that describes how the extensions work may be available in printed or online format, but no automation exists by which extensions are used in a controlled and predicable way. As such, the documentation does not provide a dedicated visualization of extension points, e.g., in a user interface for defining extensions, including allowing a user to select from patterns associated with process extensions.

Enterprise systems can provide extensibility frameworks on applications and user interface layers that include plug-in extensions. However, a controlled extension of reference core process models provided by enterprise system vendors to document their shipped processes can be lacking or non-existent. Not having an explicit extension concept for process reference models can complicate the development process, e.g., as system integrators can be required to identify and use extension points on an application code-level with low abstraction. Furthermore, a proper lifecycle-management of core processes (reference models) and extensions cannot be guaranteed. This can especially be true in the context of cloud-based enterprise systems, e.g., Software-as-a Service (SaaS). For example, SaaS platform providers need to provide dedicated extension mechanisms, as multiple customers can share the same platform. When extending a reference core process model, but not doing so in a controlled way, the overall stability and reliability of the core enterprise system cannot be guaranteed.

In some implementations, reference processes can be described as flow charts within product documentation. However, the extensions are not explicitly modeled in a formal business process modeling language nor do they provide a visualization of extension points. Beside industry approaches, some scientific approaches have been proposed regarding extensions.

Process change patterns comprise a collection of patterns for control flow changes of workflows. By applying change patterns, for example, the source process schema can be physically modified. Therefore, process change patterns do not address the goal of controlled extensibility, as the source process schema on the one hand and process extensions on the other hand cannot evolve independently.

Process flexibility patterns can deal with the adaptation of process-aware information systems grouped by various different flexibility types. For example, this pattern library may not include patterns that address the requirement of controlled reference process extensibility. By applying respective patterns, for example, the source process schema can be physically modified that hinders an independent evolution of the source schema and its extension.

As a reference core process model may be quite large to capture all possible pathways in the various settings in which it may be used, the notion of a configurable reference core process models can be introduced. Process configuration can typically be a one-off activity where there is no possibility for further adaptation of the configured model. However, the evolution of configurable reference core process models can be supported in an approach using extension points that allow an extension to be plugged into a core process model in a controlled manner.

In some implementations, process variants can support management of a base process with its variants throughout a process lifecycle. The variants can be represented, for example, by a set of change operations describing the difference between the base process and the different variants. Change operations that can be supported include, for example, operation to insert, delete, move and modify process fragments. Within the definition of change operations, adjustment points can be used to refer to elements of the base process that need to be changed. However, when applying the change operations, the base process is modified which can hinder a further evolution of the basic process as there are no dedicated extension points in the base process.

Various scientific approaches have been proposed to formalize Business Process Model and Notation (BPMN) models into ontologies in order to define, e.g., Structured Protocol and Resource Description Framework (RDF) Query Language (SPARQL) queries on top of it. However, none of these approaches deals with modeling and query extension points as addressed by this disclosure.

SUMMARY

The disclosure generally describes computer-implemented methods, software, and systems for querying extension point information and providing extension patterns for core process models. For example, information for a core process model user interface is provided for use in a client device for initiating display of a core process model as a visualization that identifies steps of the core process model and presents dedicated extension points for inserting, into the core process model, user-defined extensions. The information is provided by a server and from a core process model meta-model stored at the server. Selections of the extension points and customization of extensions associated with the extension points are received from a client device. A core process model instance including the core process model and customizations of the extensions are stored at the server and in a repository of core process model instances. Information is provided for use at the client device for presenting a process extension query interface. A query is received from the client device. Query results including information associated with extension points matching the query are identified at the server and from the repository. The query results are provided for presentation in the process extension query interface.

One computer-implemented method includes: providing, by a server and from a core process model meta-model stored at the server, information for a core process model user interface on a client device initiating display of a core process model as a visualization that identifies steps of the core process model and presents dedicated extension points for inserting, into the core process model, user-defined extensions; receiving, from a client device, selections of the extension points and customization of extensions associated with the extension points; storing, at the server and in a repository of core process model instances, a core process model instance including the core process model and customizations of the extensions; providing information for use at the client device for presenting a process extension query interface; receiving a query from the client device; identifying, at the server and from the repository, query results including information associated with extension points matching the query; and providing the query results for presentation in the process extension query interface.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

In a first aspect, combinable with any of the previous aspects, the method further comprises: providing, by the server and with the information for the core process model user interface, wherein the process extension patterns are available from an extendable library in which individual process extension patterns can be added or deleted, information associated with process extension patterns for presentation in the core process model user interface; receiving, from the client device, a selection of a particular process extension pattern from the process extension patterns; and incorporating the selected particular process extension pattern into the core process model instance before the storing.

In a second aspect, combinable with any of the previous aspects, the method further comprises: converting the received query into a generated query of another format; and providing the generated query for presentation in the core process model user interface.

In a third aspect, combinable with any of the previous aspects, the query is formulated using a process extension query language that supports a specification of queries on extension points of core process models and extensions plugged into the core process models.

In a fourth aspect, combinable with any of the previous aspects, a complexity of the query is hidden and abstracted using an application programming interface (API) that allows a consumer to formulate the query based on an API, and wherein the method further comprises using the API to automatically generate a Structured Protocol and Resource Description Framework (RDF) Query Language (SPARQL) query to be processed by an ontology reasoning engine.

The subject matter described in this specification can be implemented in particular implementations so as to realize one or more of the following advantages. First, visualization of extension points can simplify the identification of extension spots for system integrators/consultants. Second, a process extension query language can standardize a process for defining queries on extension points within reference core process models. Third, pre-defined process extension patterns selectable by users can simplify the process of using extension points. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 is a block diagram illustrating example additional modeling elements for a Business Process Model and Notation (BPMN) language, according to an implementation.

FIGS. 7E-7M are block diagrams collectively illustrating example extensible markup language (XML) related to the ontology, according to an implementation.

FIG. 9 is a block diagram illustrating another example query on the reference core process shown in FIG. 6, according to an implementation.

Like reference numbers and designations in the various drawings indicate like elements.

DETAILED DESCRIPTION

Figure 1:
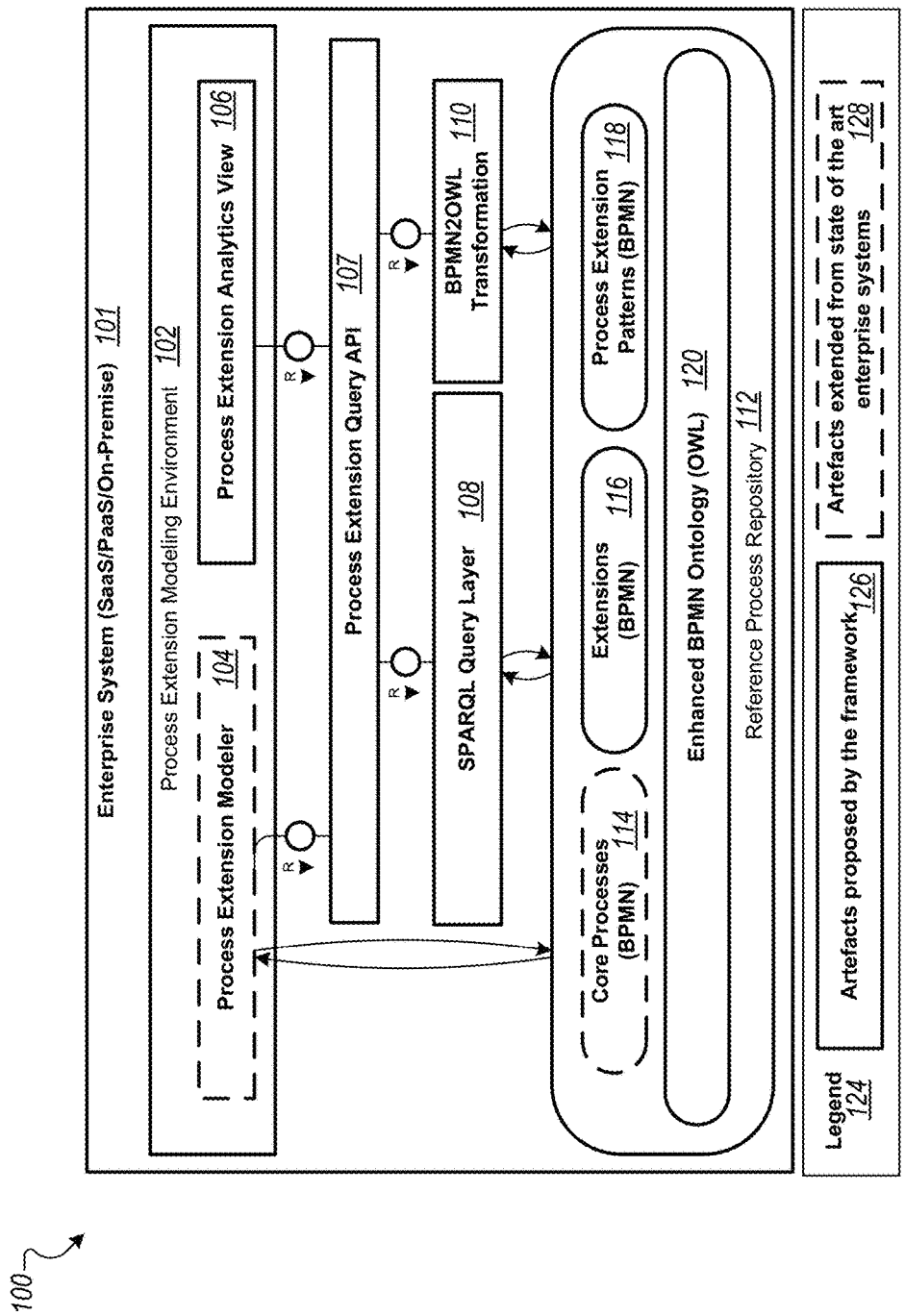
FIG. 1 is a block diagram illustrating a system architecture of a controlled reference process extensibility framework, according to an implementation.

This disclosure generally describes computer-implemented methods, software, and systems for controlled mechanisms for defining and using extensions associated with reference core process models. Specifically, methods, software, and systems are provided for querying extension point information and providing extension patterns for core process models.

This described subject matter proposes the enhancement of state-of-the art reference core process models with explicit extensibility support. For example, core reference processes can be modeled with dedicated extension points where extensions can be plugged-in in a controlled manner. Proper lifecycle management of both core and extension processes can be achieved, for example, using a controlled reference process extensibility framework that includes following contributions that exceed state-of-the-art systems.

First, a modeling approach included in the framework can be provided that enriches reference core process models with dedicated extension points. For example, the approach can include a visualization capability for extension points that can simplify the identification of extension spots for system integrators/consultants. For example, the extension points can be presented in a consistent way in a user interface for defining extensions for core process models. The approach also includes a meta-model for defining extension points, e.g., presented as stable anchors that allow users and partners to plug in process extensions in a controlled manner. This can ensure proper lifecycle management of the core process and its extensions, e.g., in a controlled evolution.

Second, a process extension query language included in the framework can be provided that allows the definition of queries on extension points within reference core process models. Reference processes modelled in Business Process Model and Notation (BPMN), for example, can be transformed into a BPMN ontology that allows defining queries on extension points, the queries using, e.g., Structured Protocol and Resource Description Framework (RDF) Query Language (SPARQL) or some other language.

Third, process extension patterns that are included in the framework can describe frequently observed interaction patterns (e.g., flavors) between a core process and its extension(s). For example, the patterns can be based on observed usage of extensions for core processes that are extended by customers.

In some implementations, the concepts and components associated with the framework can be demonstrated (and/or implemented) as an enhancement of the BPMN language. Other ways of providing the framework are possible.

In some implementations, the framework described by this disclosure can be provided in at least two application domains. For example, the framework can provide a controlled extension of core processes that are exposed by on-premise enterprise systems. In another example, the framework can provide a controlled extension of core processes that are exposed by cloud-based enterprise systems, such as Software-as-a-Service (SaaS), Platform-as-a-Service (PaaS) and other systems.

FIG. 1 is a block diagram illustrating a system architecture of a controlled reference process extensibility framework 100, according to an implementation. Line styles of the components indicate which artefacts (solid lines) are provided by the framework and which components (dashed lines) are reused from state-of-the-art enterprise systems and extended by the framework.

The framework can include an enterprise system 101 that includes a process extension modeling environment 102 (e.g., including at least on user interface), a process extension modeler 104 that facilitates the definition of core process models, and a process extension analytics view 106 for submitting and reviewing the results of queries associated with extensions. In some implementations, a process extension query API 107 can be provided to serve as an API layer below the process extension analytics view 106, providing access to a SPARQL query layer 108 and a transformation component 110 (e.g., BPMN to Web Ontology Language (OWL)).

In some implementations, the framework can include a reference process repository 112 that includes core processes 114 (e.g., implemented in BPMN), extensions 116 (e.g., implemented in BPMN), process extension patterns 118 (e.g., implemented in BPMN), and an enhanced BPMN ontology 120 (e.g., implemented in OWL). A legend 124 identifies components of the framework as being either among artefacts 126 proposed (solid lines) by the framework or artefacts 128 extended (dashed lines) from state-of-the-art enterprise systems.

Figure 2:
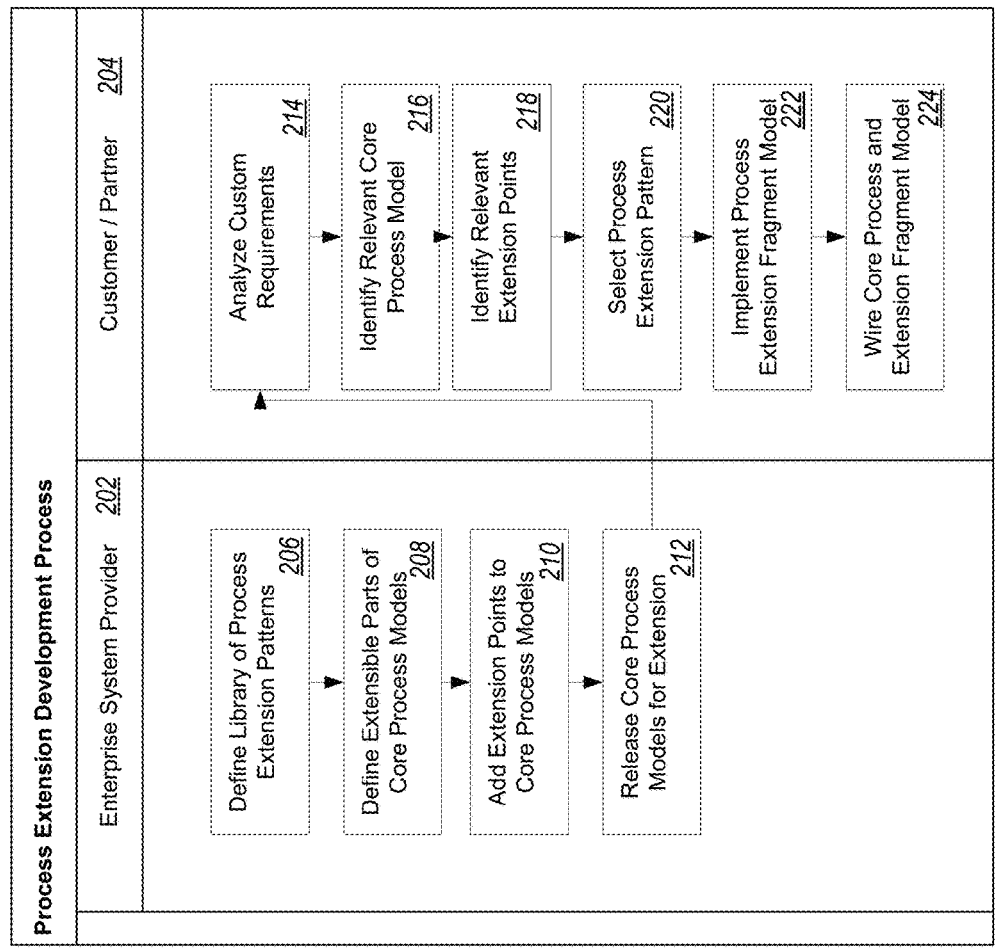
FIG. 2 is a flow diagram of an example process for controlled reference process extensibility, according to an implementation.

FIG. 2 is a flow diagram of an example process for controlled reference process extensibility, according to an implementation. For example, FIG. 2 shows an underlying methodology of the controlled reference process extensibility framework. An enterprise system provider 202 can be responsible, for example, for defining (for use by customers/partners 204) extension points within core reference processes as stable anchors. For example, customers and partners can extend pre-defined extension spots with custom process extension fragment.

At 206, the enterprise system provider 202 can define a library of process extension patterns. At 208 extensible parts of core process models are defined. At 210, extension points are added to core process models. At 212, core process models are released for extension.

At 214, customers/partners 204 can analyze custom requirements. At 216, a relevant core process model is identified. At 218, relevant extension points are identified. At 220, process extension pattern is selected. At 222, a process extension fragment model is implemented. At 224, the core process and extension fragment model are wired.

To address the requirement of controlled extension of reference processes, we have applied the principle of plug-ins known from component-based software engineering to business core process modeling.

Figure 3:
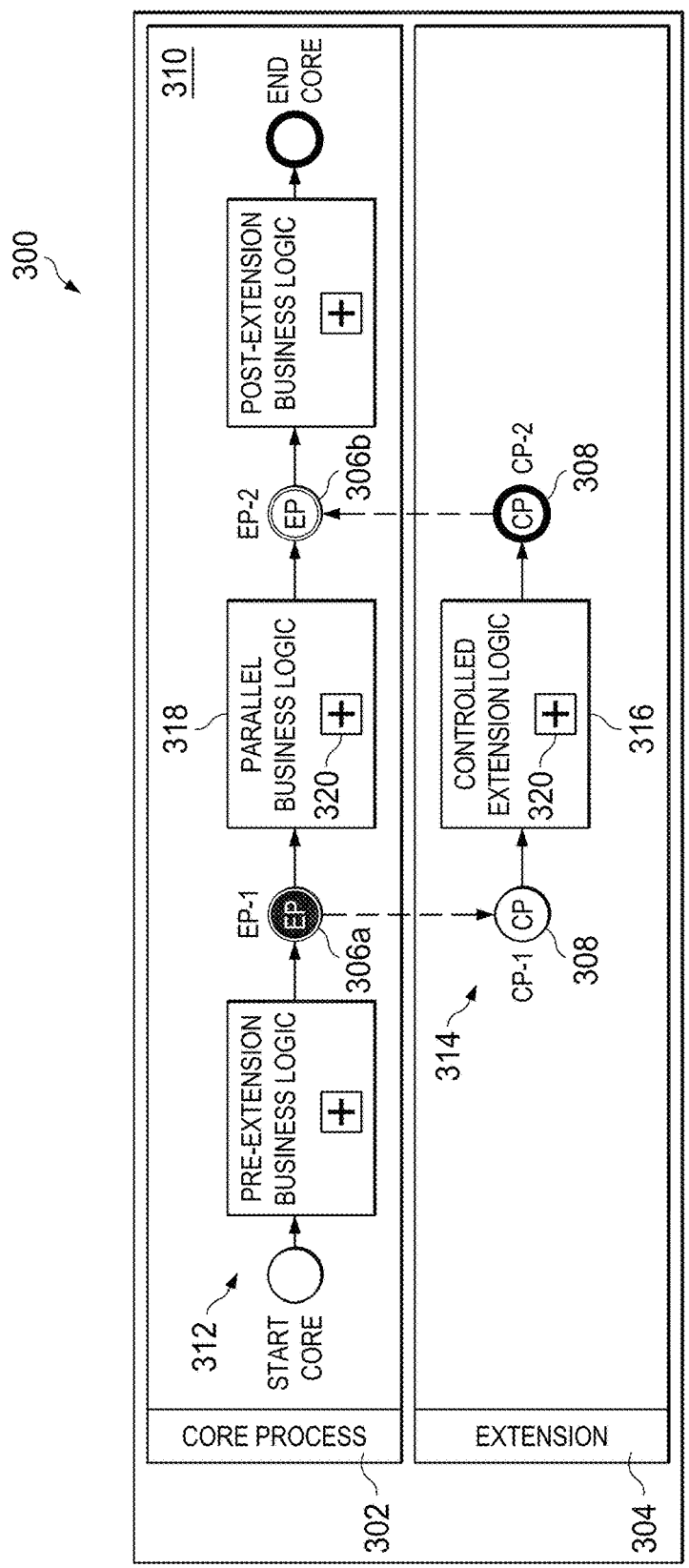
FIG. 3 is a block diagram illustrating an example of sample process extension scenario 300, according to an implementation.

FIG. 3 is a block diagram illustrating an example of sample process extension scenario 300, according to an implementation. In some implementations, the concept can be used in association with an extension of the BPMN modeling language, e.g., to link a core process 302 and an extension 304 using extension points 306a, 306b and connection point 308. For example, the core process (e.g., BPMN) can be enhanced with a dedicated extension point concept that allows specifying the extensible parts of a core process and specifying extension fragments that plug-in into the core process.

An upper pool 310 contains the core process 312 that is delivered by the vendor of the packaged enterprise systems. The core process 312 exposes an outbound extension point 306a and an inbound extension point 306b. Both extension points 306a, 306b are used to plug in an extension process 314, defined by partners or customers. Each used (or activated) extension point 306a, 306b is connected to a corresponding connection point 308 of the extension process 314. The extension process 314 includes controlled extension logic 316, e.g., that extends parallel business logic 318, the detailed logic of which can be exposed using controls 320.

FIG. 4 is a block diagram illustrating example additional modeling elements 402-408 for the BPMN language, according to an implementation. For example, the elements 402-408 are specializations of BPMN events. The specialization can allow the actual wiring between a core process 410 and an extension 412 to be modeled as a process extension pattern.

Figure 5:
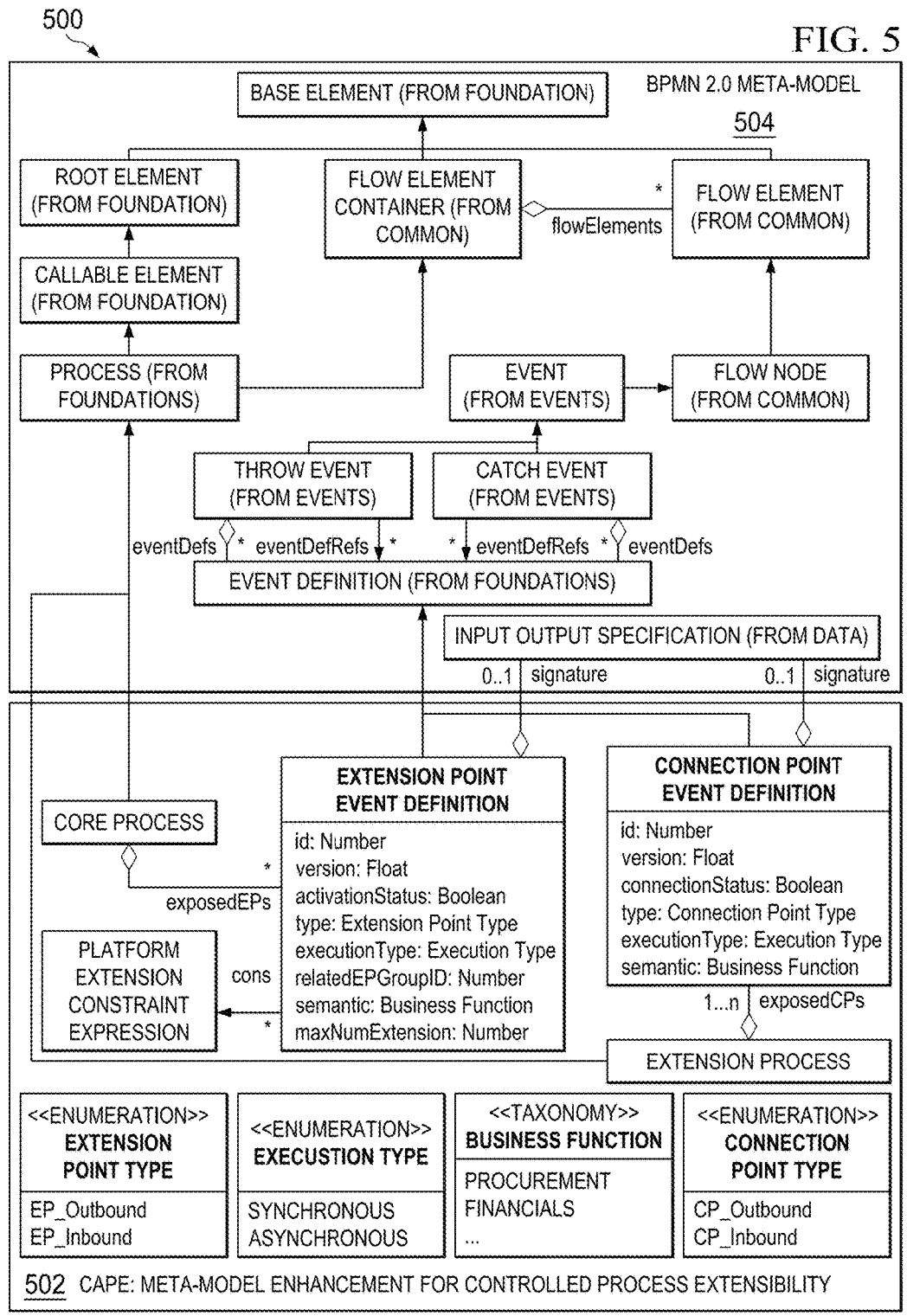
FIG. 5 is a block diagram illustrating an example integration of modeling enhancements into an existing BPMN meta-model, according to an implementation.

FIG. 5 is a block diagram illustrating an example integration 500 of modeling enhancements 502 into an existing BPMN meta-model 504, according to an implementation.

Figure 6:
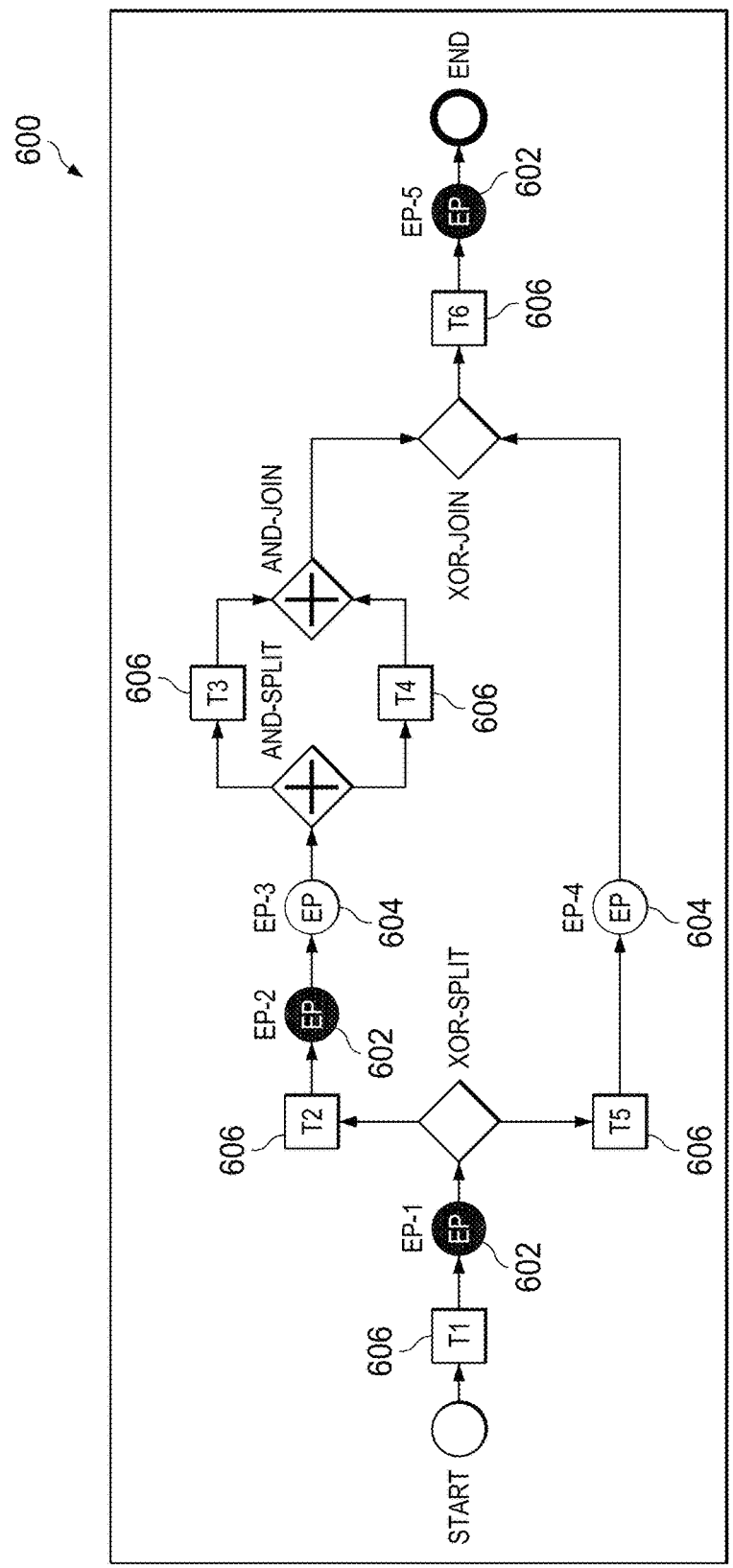
FIG. 6 is a block diagram illustrating an example reference core process including three outbound extension points and two inbound extension points, according to an implementation.
Figure 7A:
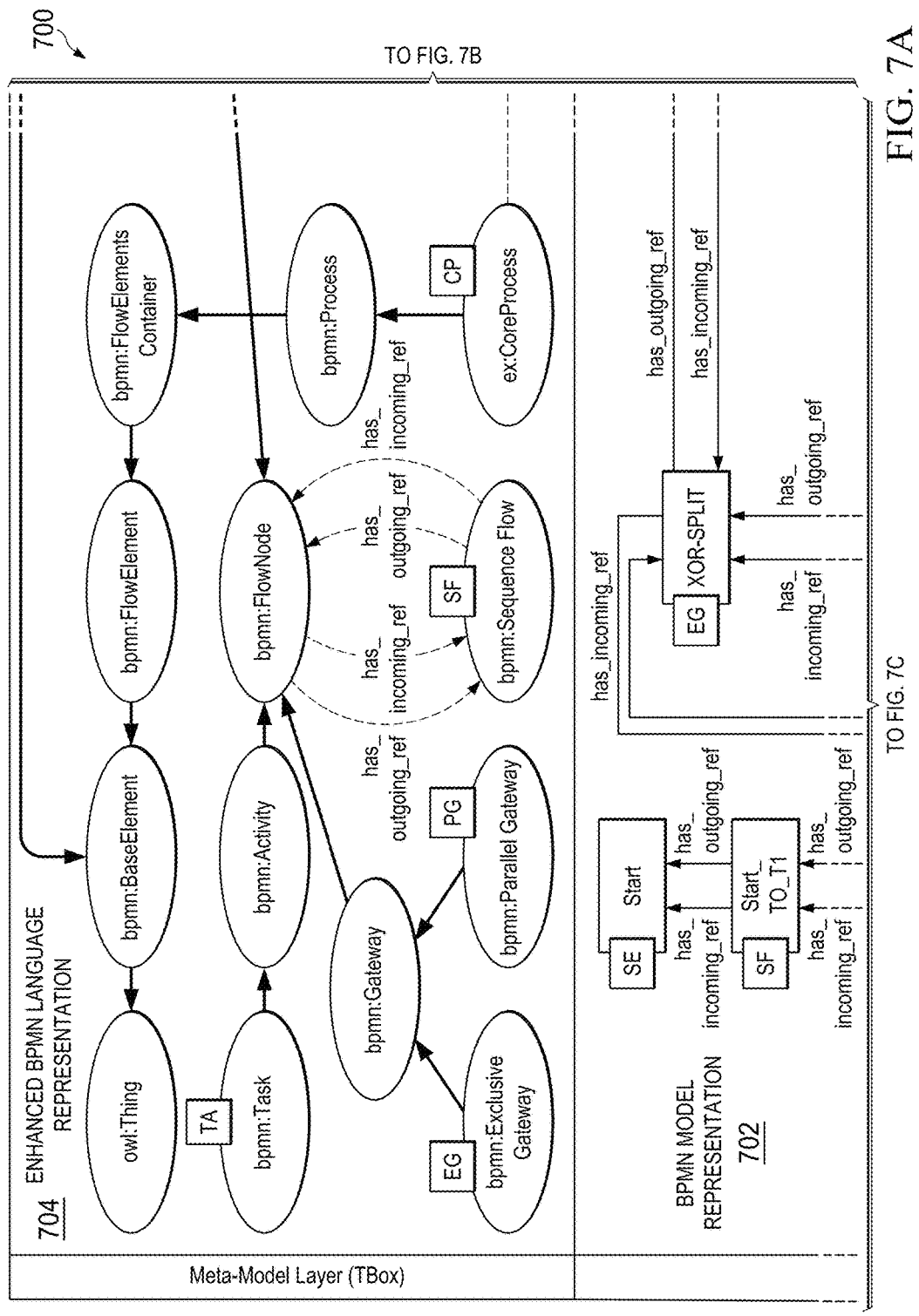
FIGS. 7A-7D are block diagrams illustrating a mapping of the reference core process shown in FIG. 6, mapped into a corresponding ontology, according to an implementation.
Figure 7B:
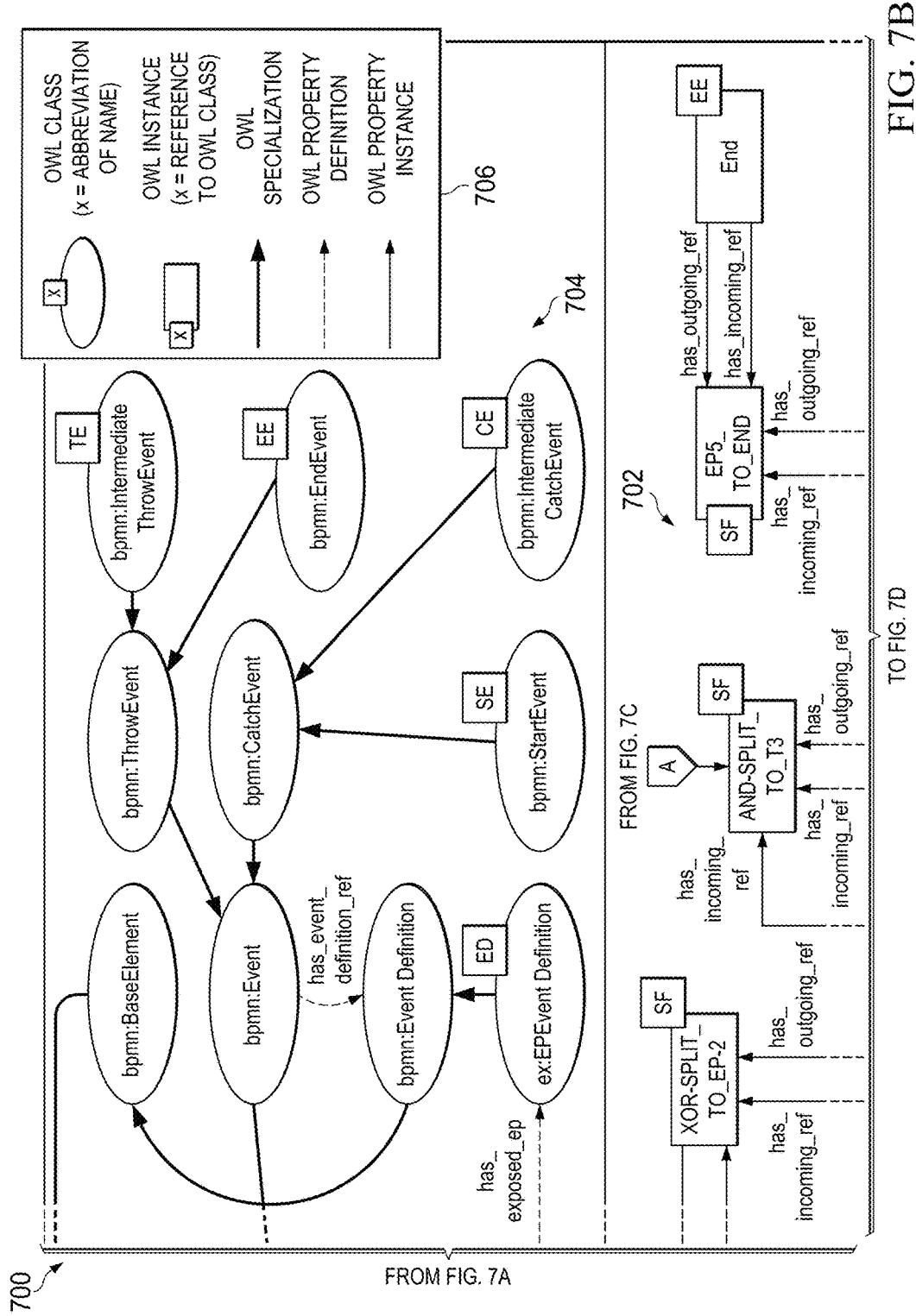
Figure 7C:
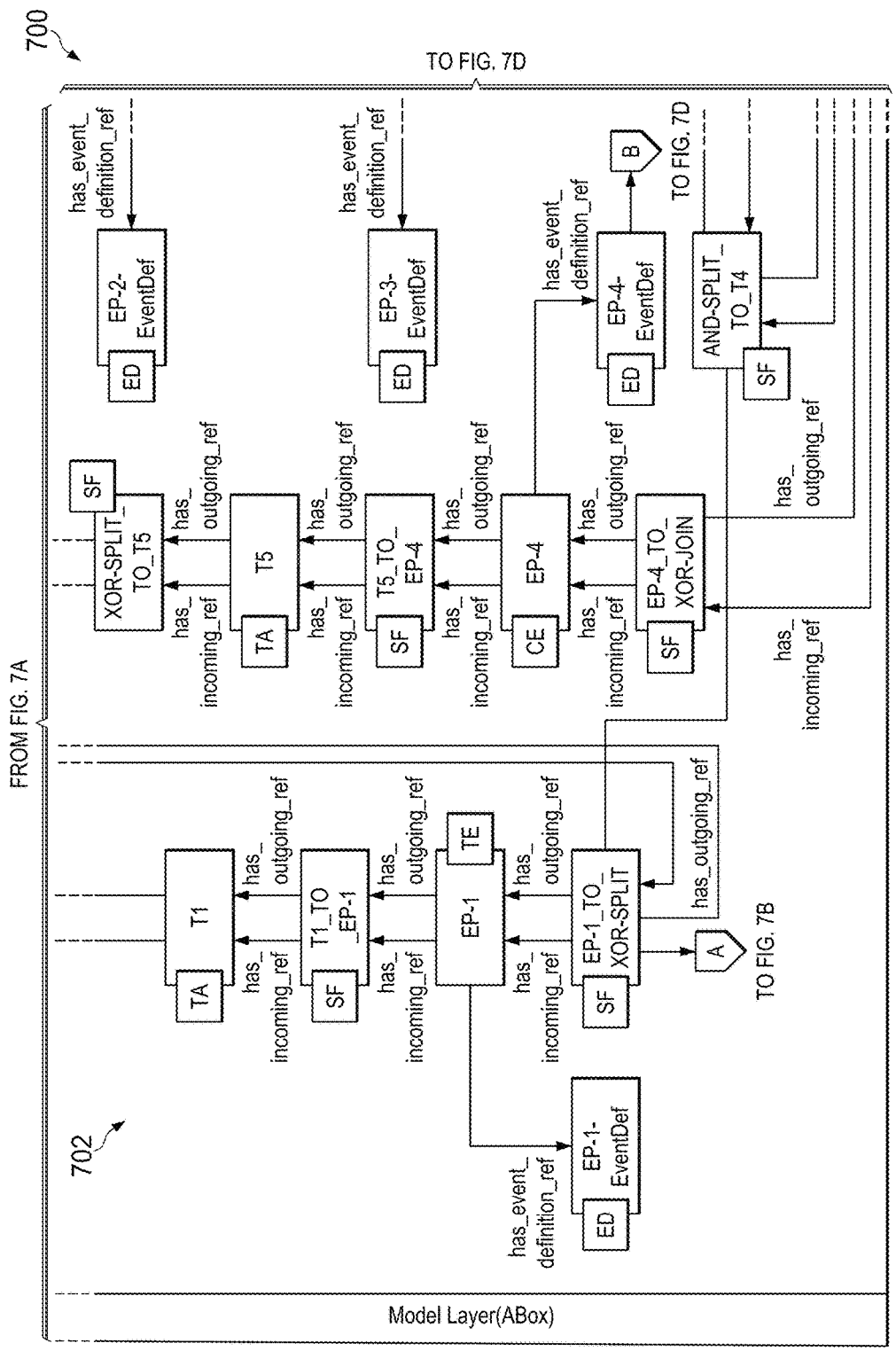
Figure 7D:
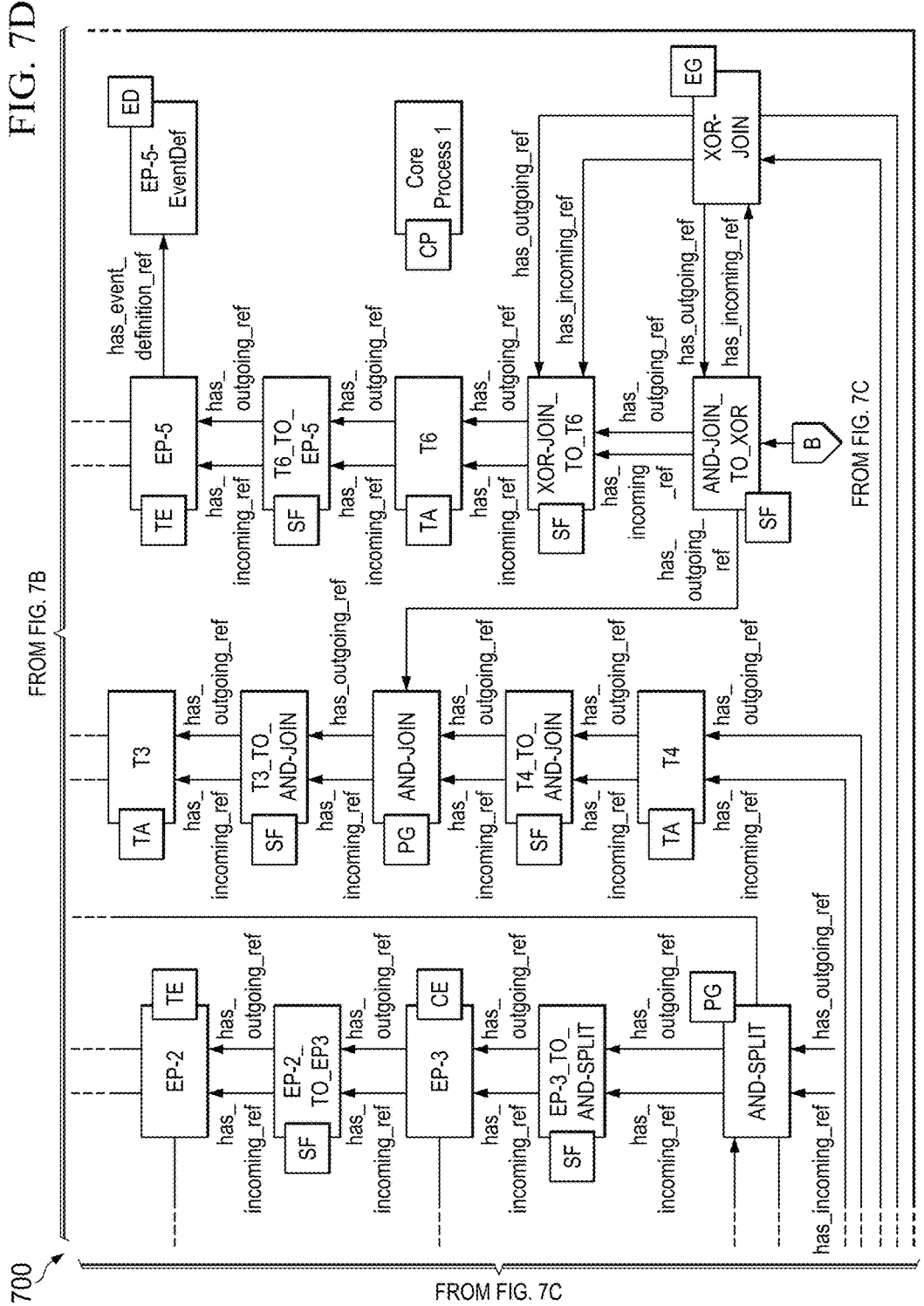

FIG. 6 is a block diagram illustrating an example reference core process 600 including three outbound extension points 602 and two inbound extension points 604, according to an implementation. The reference core process 600 includes tasks 606. This example is expanded upon below in describing the process extension query language that allows, for example, defining and processing queries on top of exposed extension points of core reference processes. For example, the reference core process 600 modeled in BPMN, with enhancements as shown in FIG. 6, can be transformed into an ontological representation in order to provide a foundation for defining and processing queries on top of the core process model. In some implementations, the transformation can be facilitated using an enhanced BPMN ontology, e.g., using OWL. For example, using the transformation component 110, a BPMN model can be transformed into an ontological representation.

FIGS. 7A-7D are block diagrams illustrating a mapping of the reference core process shown in FIG. 6, mapped into a corresponding ontology, according to an implementation. For example, the ontological representation in XML format of the core process model shown in FIG. 6 is formalized as an instance of an enhanced BPMN Ontology. The mapping 700 shows a BPMN model representation 702 and an enhanced BPMN language representation 704. A legend 706 defines semantics of elements in the mapping.

FIGS. 7E-7M are block diagrams collectively illustrating example XML related to the ontology, according to an implementation.

Figure 8:
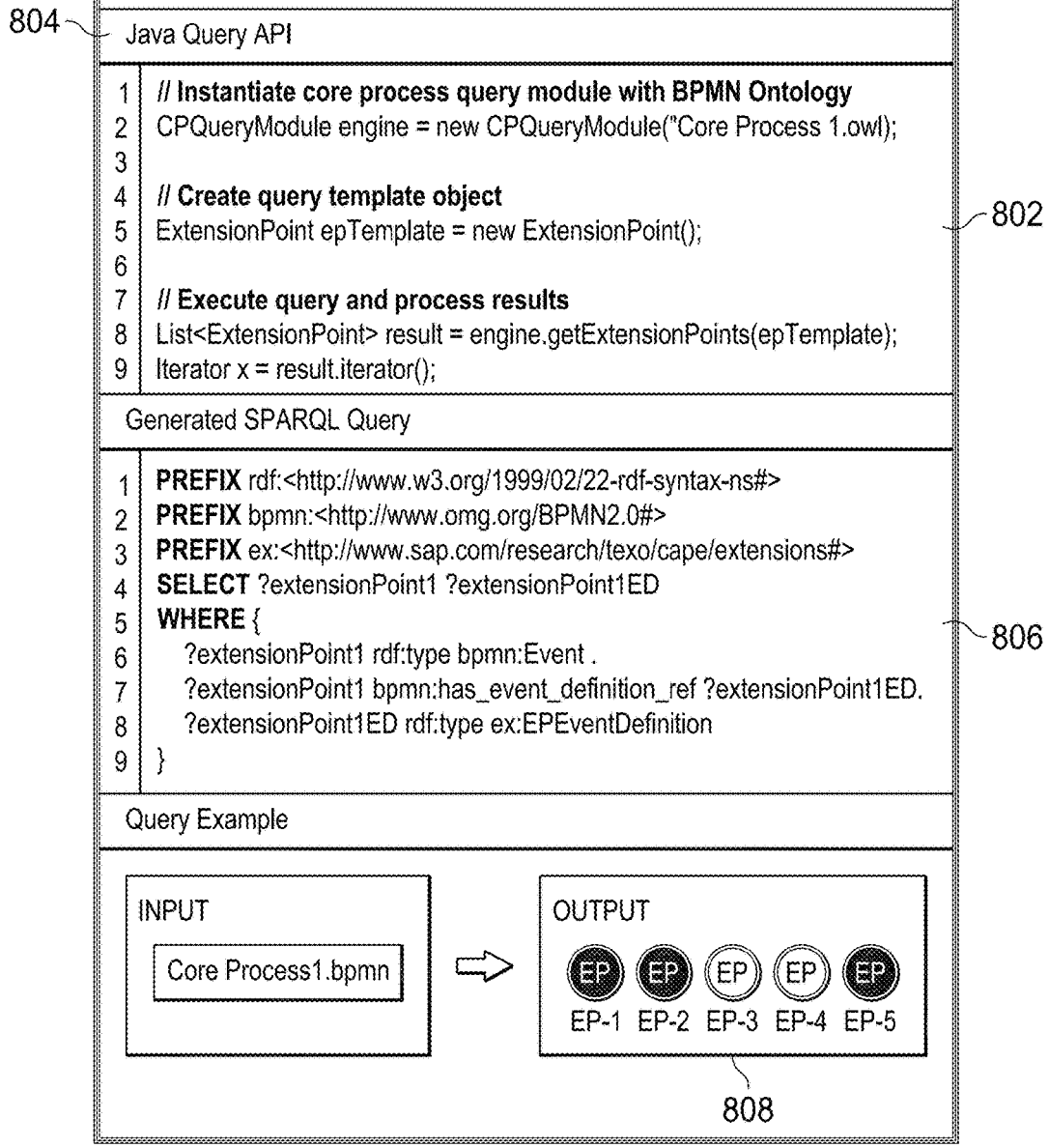
FIG. 8 is a block diagram illustrating a sample query on the reference core process shown in FIG. 6, according to an implementation.

FIG. 8 is a block diagram illustrating a sample query 802 on the reference core process 600 shown in FIG. 6, according to an implementation. For example, the ability to query core process model extension points is also included in the framework described in this disclosure. The query 802, e.g., entered through a JAVA query API 804, can retrieve all extension points with the specified properties. The Java-based API can allow querying of process elements and extension points from core process models. Queries can be dynamically transformed into SPARQL queries 806 and processed on top of the enhanced BPMN ontology.

FIG. 9 is a block diagram illustrating another example query 902 on the reference core process 600 shown in FIG. 6, according to an implementation. For example, the query 902 can retrieve all extension points with the specified properties: it retrieves all extension points that are outbound extension point and associated with tasks T1 through T6.

For both of the queries 802 and 902, the process extension query API can be used. Automatically-generated SPARQL queries 806 and 904, respectively, can be displayed (e.g., to a user submitting the queries).

Process extension patterns are also included in the framework described in this disclosure. For example, process extension patterns support a process extensibility concept and can be developed, for example, by systematically analyzing various combinations of core processes and extensions used by customers. As a result, at least six process extension patterns are possible, having the following flavors.

Figure 10:
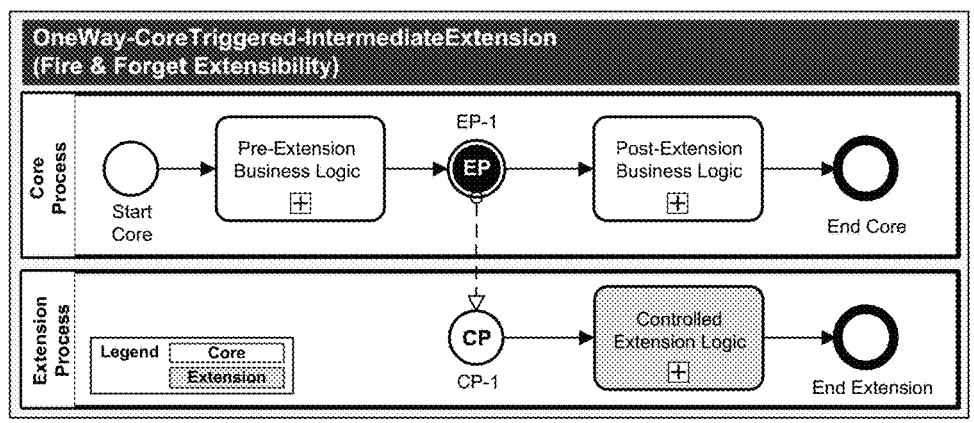
FIG. 10 is a block diagram showing an example one-way, core-triggered intermediate extension, according to an implementation.

FIG. 10 is a block diagram showing an example one-way, core-triggered intermediate extension 1000, according to an implementation. For example, the extension can provide a fire and forget extensibility. In this flavor, the core process asynchronously spawns an instance of the extension process. After triggering the extension process, the core process and the extension continue independently from each other without a synchronization point in the later process flow. The interaction between the core process and the extension occurs only in one way and the outbound extension point must not be the first or last element within the core process. Data flows from the core process to the extension.

Figure 11:
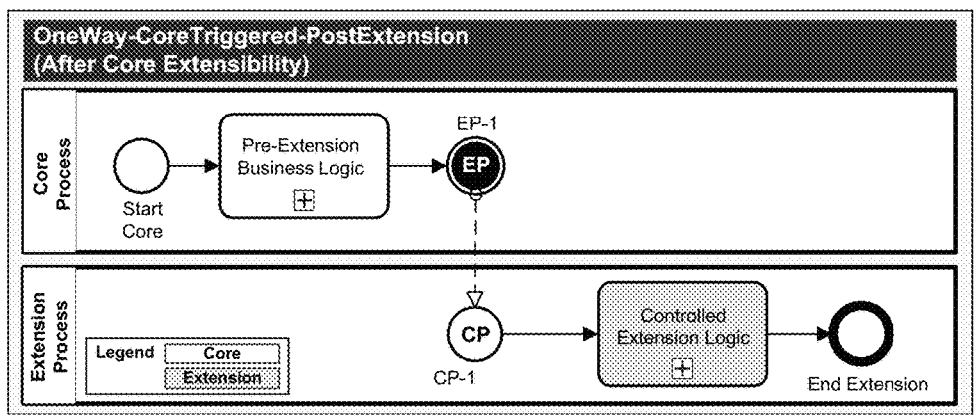
FIG. 11 is a block diagram showing an example one-way, core-triggered post extension, according to an implementation.

FIG. 11 is a block diagram showing an example one-way, core-triggered post extension 1100, according to an implementation. For example, the extension can provide an after-core extensibility. In this flavor, the extension is asynchronously triggered after the core process is completed. The interaction between the core process and the ex-tension occurs only in one way and the extension point is the last element in the core process. Data flows from the core to the extension.

Figure 12:
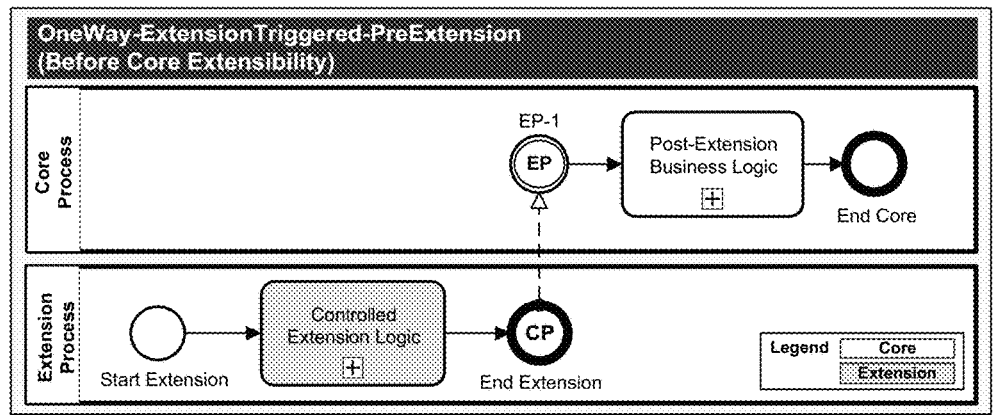
FIG. 12 is a block diagram showing an example one-way, core-triggered pre-extension extension, according to an implementation.

FIG. 12 is a block diagram showing an example one-way, core-triggered pre-extension extension 1200, according to an implementation. For example, the extension can provide a before-core extensibility. In this flavor, the core process is asynchronously triggered after the extension is completed. The interaction between the core process and the ex-tension occurs only in one way and the inbound extension point is the first element in the core process. Data flows from the extension to the core process.

Figure 13:
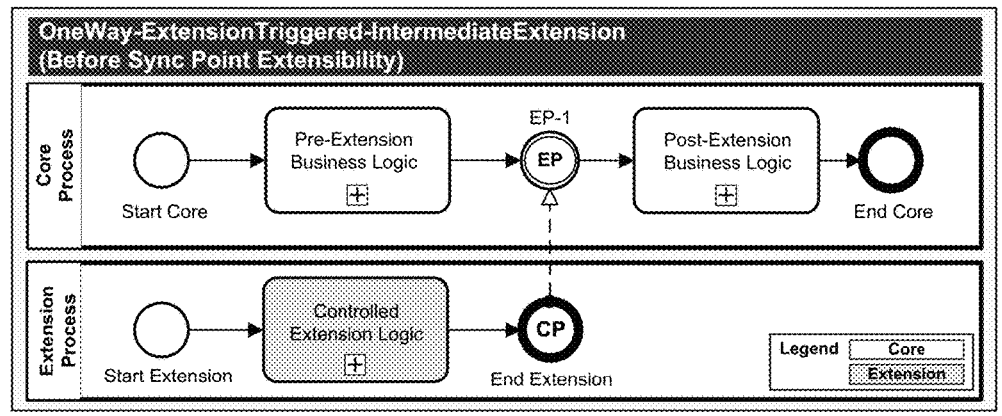
FIG. 13 is a block diagram showing an example one-way, core-triggered intermediate extension, according to an implementation.

FIG. 13 is a block diagram showing an example one-way, core-triggered intermediate extension 1300, according to an implementation. For example, the extension can provide a before-sync-point extensibility. In this flavor, the core process executes until an in-bound extension point is reached (synchronization point). It only continues, when the plugged-in extension has been completed. The interaction between the extension and the core process occurs only in one way and the inbound extension point must not be the first or last element within the core process. Data flows from the extension to the core process.

Figure 14:
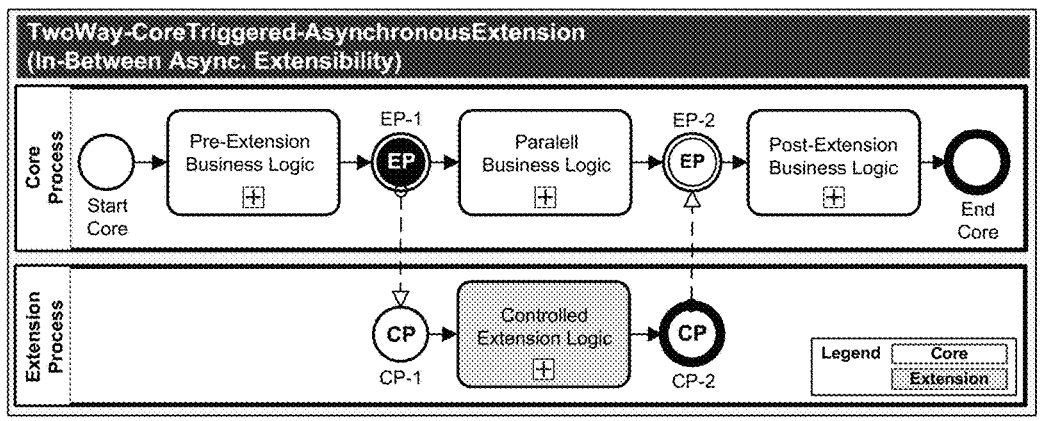
FIG. 14 is a block diagram showing an example two-way, core-triggered asynchronous extension, according to an implementation.

FIG. 14 is a block diagram showing an example two-way, core-triggered asynchronous extension 1400, according to an implementation. For example, the extension can provide an in-between-asynchronous extensibility. In this flavor, the core process asynchronously spawns an instance of the extension and concurrently continues with the core execution. Both processes are synchronized again when the second extension point is reached. The interaction between the core process and the extension occurs in two ways. Data flows from the core process to the extension and vice versa.

Figure 15:
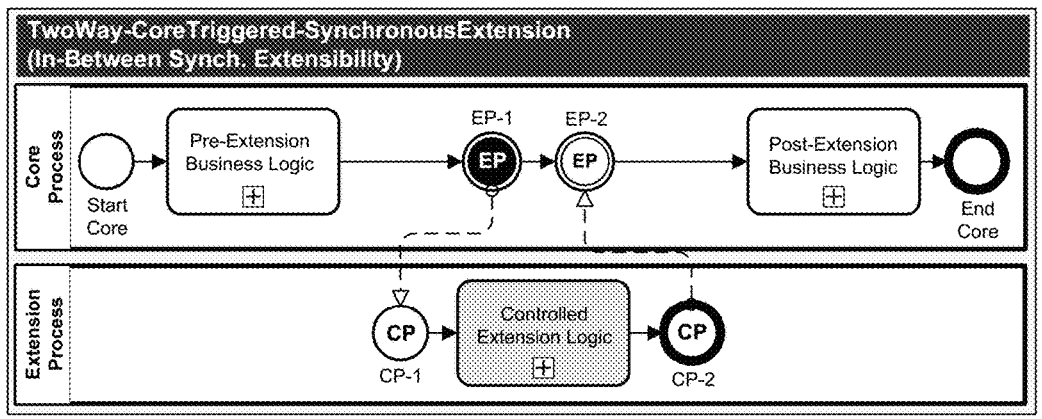
FIG. 15 is a block diagram showing an example two-way, core-triggered synchronous extension, according to an implementation.

FIG. 15 is a block diagram showing an example two-way, core-triggered synchronous extension 1500, according to an implementation. For example, the extension can provide an in-between-synchronous extensibility. In this flavor, the core process spawns an instance of the extension and stops executing until the extension is completed. Both processes are synchronized again when the second extension point is reached. The in-bound extension point must directly follow the outbound extension point in order. The interaction between the core process and the extension occurs in two ways. Data flows from the core process to the extension process and vice versa.

The concepts described above can be implemented, for example, using an extended version of an existing BPMN modeling tool.

Figure 16:
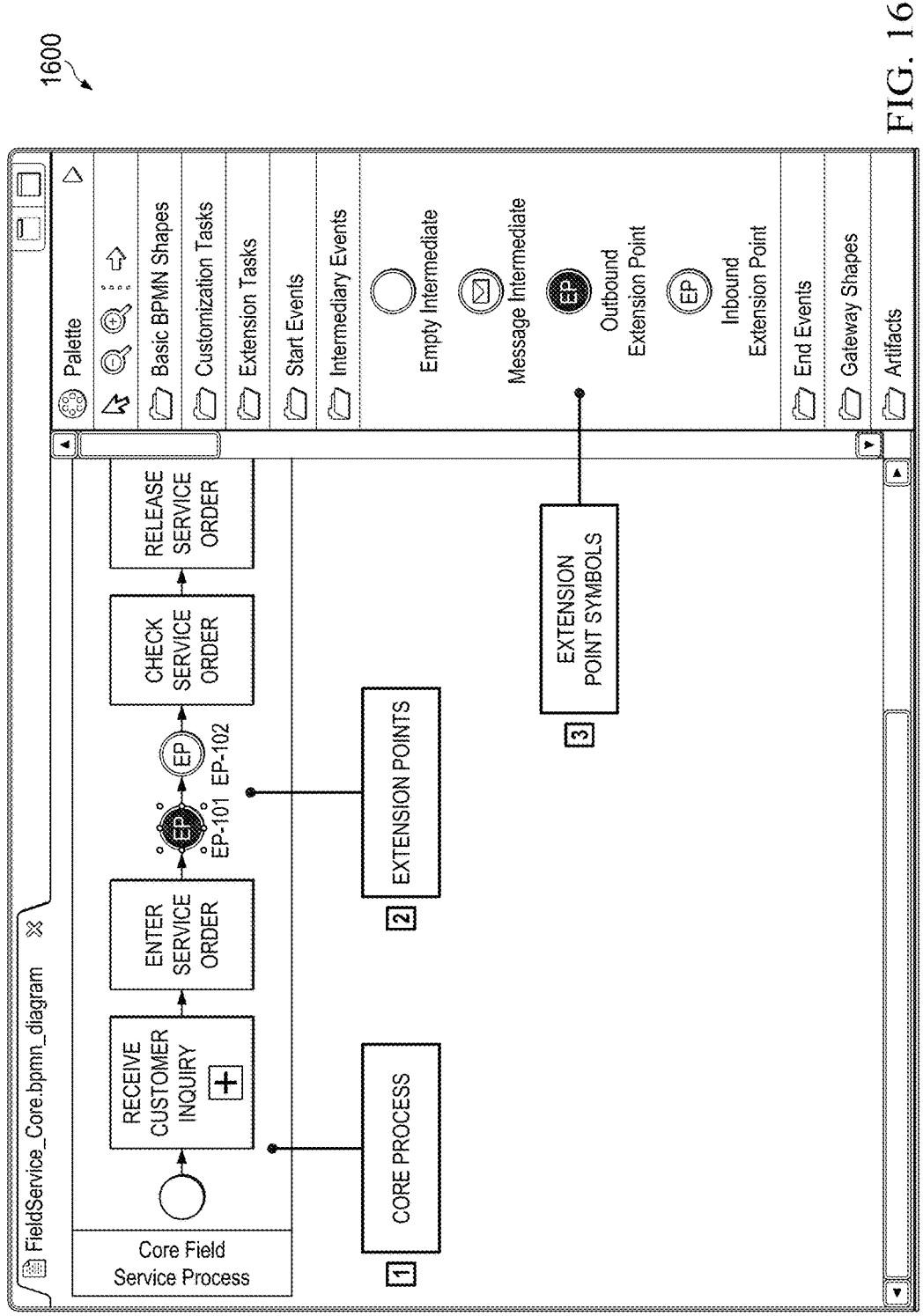
FIG. 16 is a screenshot illustrating an example process extension modeler including its additional modeling elements, according to an implementation.

FIG. 16 is a screenshot illustrating an example process extension modeler 1600 including its additional modeling elements, according to an implementation.

Figure 17:
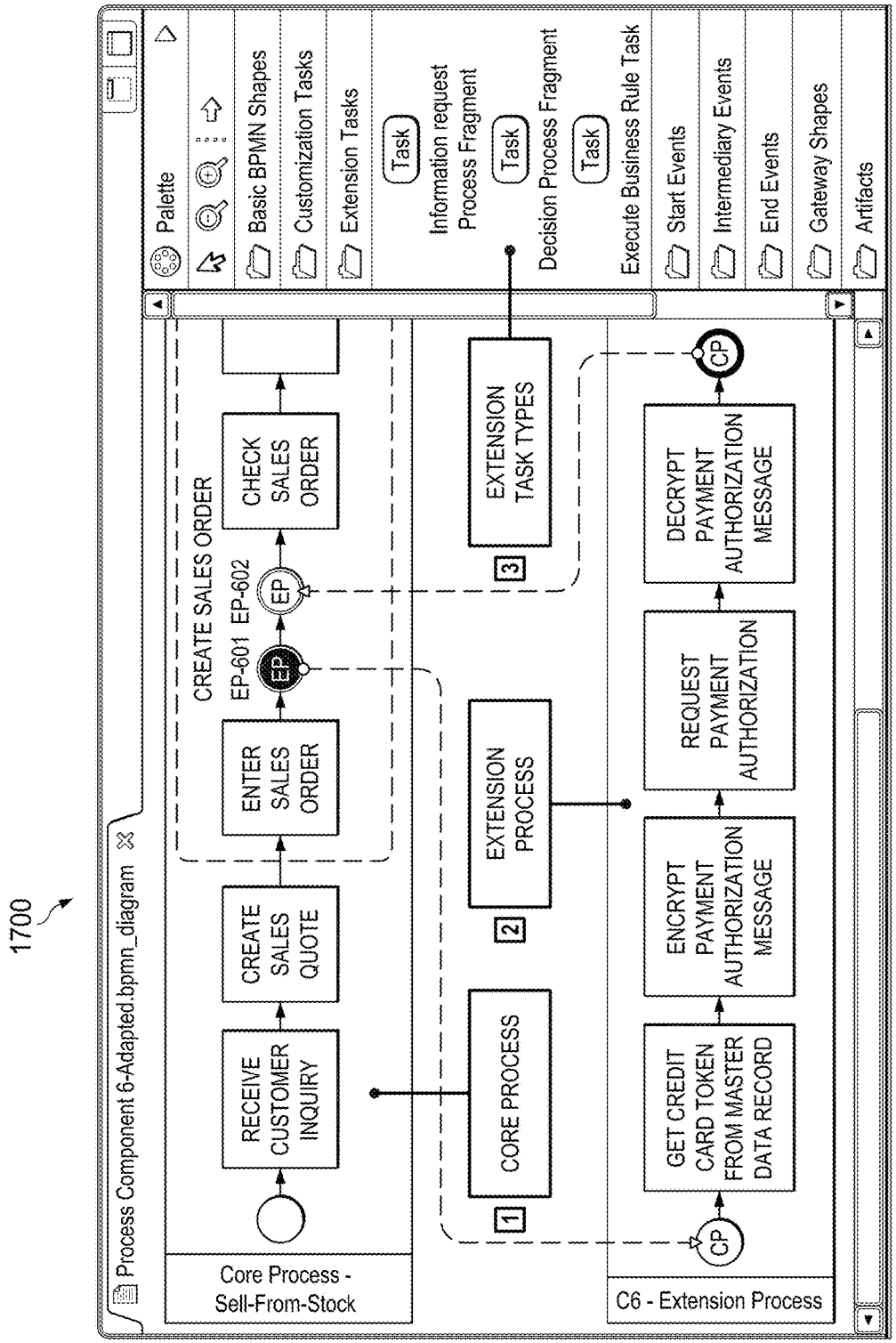
FIG. 17 is a block diagram illustrating an example extension process that is wired into the core process, according to an implementation.

FIG. 17 is a block diagram illustrating an example extension process 1700 that is wired into the core process, according to an implementation.

Figure 18A:
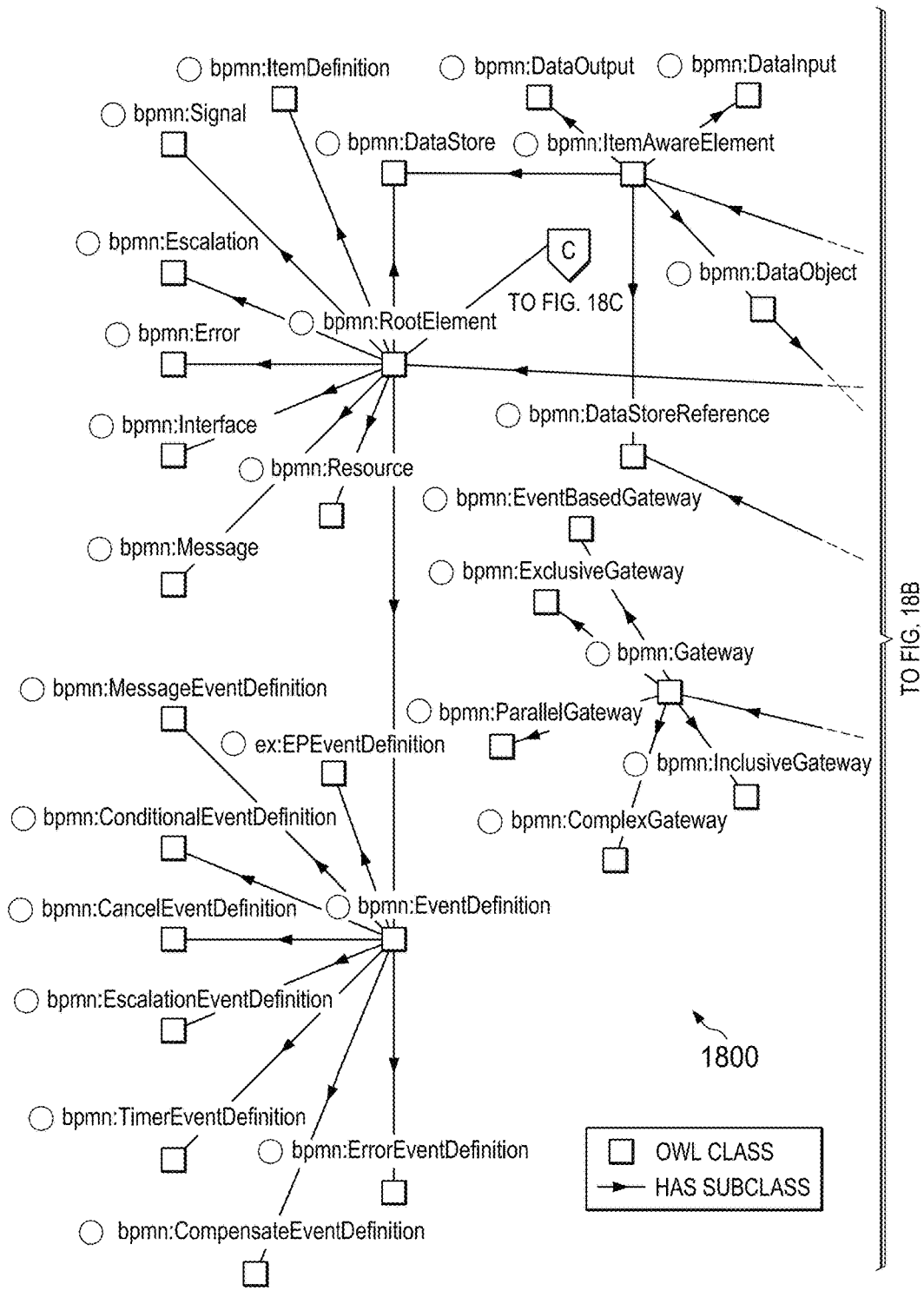
FIGS. 18A-18C are block diagrams illustrating an example extract of the enhanced BPMN ontology visualized in Protégé, according to an implementation.
Figure 18B:
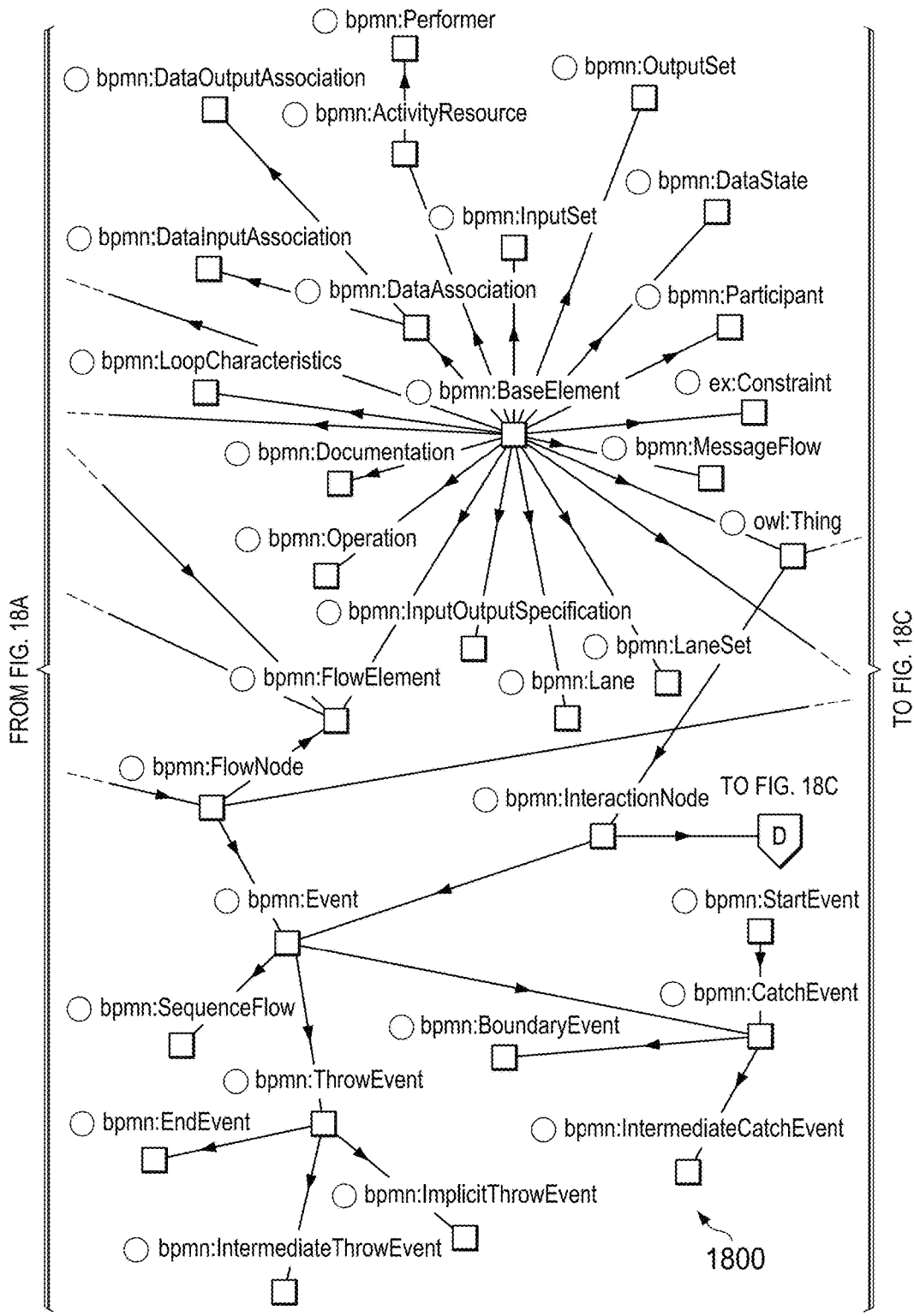
Figure 18C:
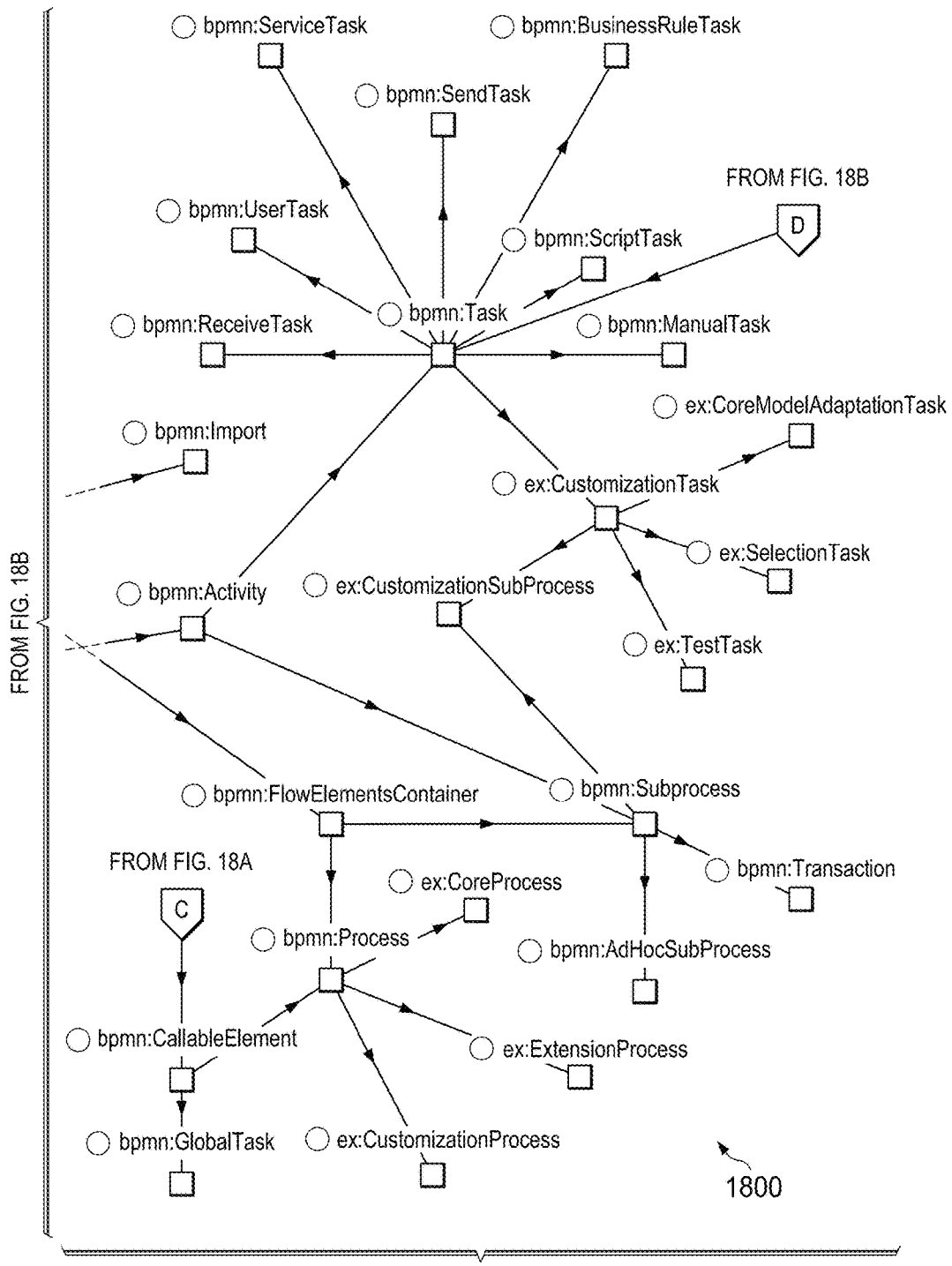

FIGS. 18A-18C are block diagrams illustrating an example extract of the enhanced BPMN ontology visualized in Protégé, according to an implementation.

Figure 19:
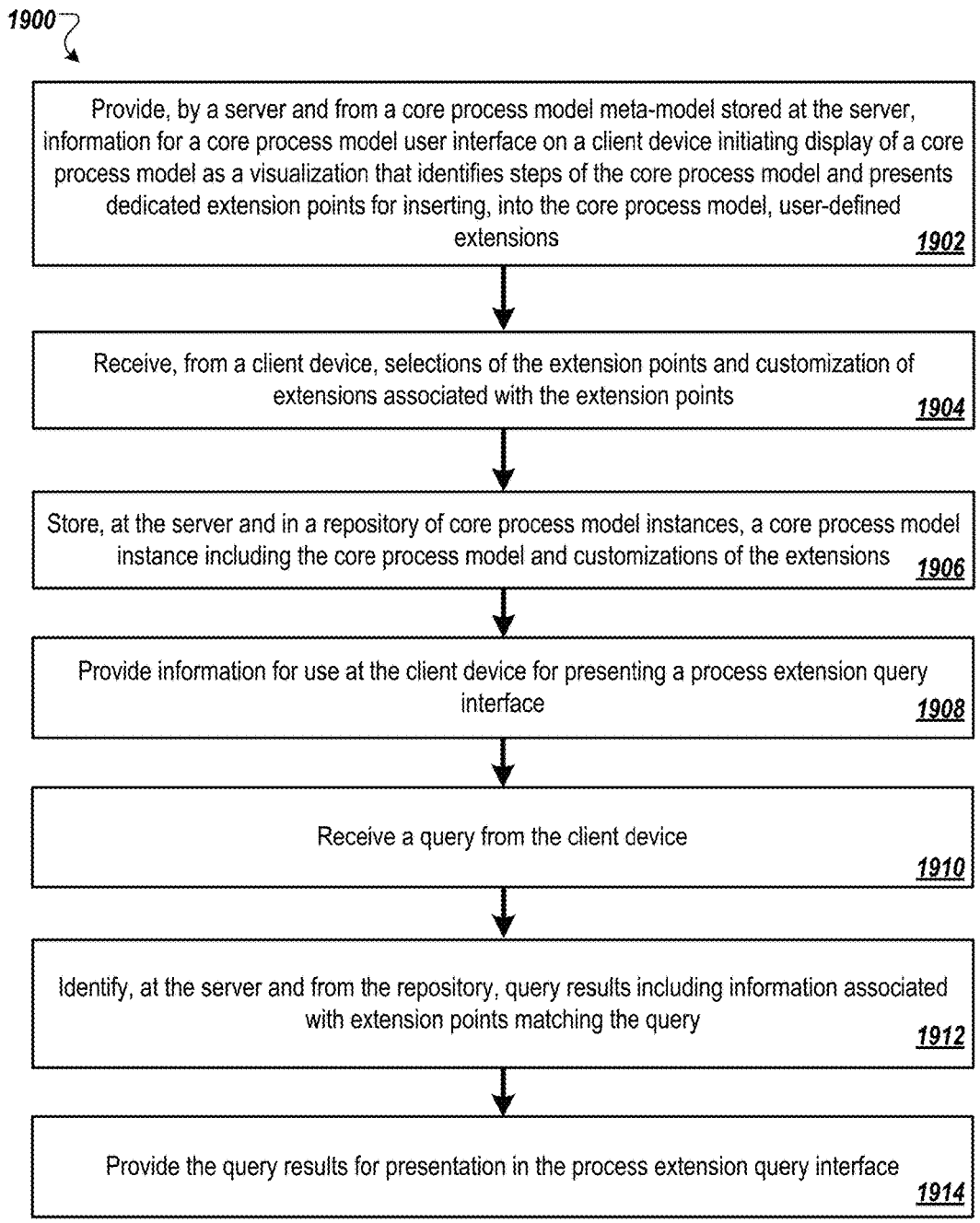
FIG. 19 is a flowchart of an example method for using and querying information associated with extensions for core process models, according to an implementation.

FIG. 19 is a flowchart of an example method 1900 for using and querying information associated with extensions for core process models, according to an implementation. For clarity of presentation, the description that follows generally describes method 1900 in the context of FIGS. 1-18. However, it will be understood that the method 1900 may be performed, for example, by any other suitable system, environment, software, and hardware, or a combination of systems, environments, software, and hardware as appropriate.

At 1902, information for a core process model user interface is provided for use in a client device for initiating display of a core process model as a visualization that identifies steps of the core process model and presents dedicated extension points for inserting, into the core process model, user-defined extensions. The information is provided by a server and from a core process model metamodel stored at the server. For example, the enterprise system 101 can provide the process extension modeling environment 102 to a user who is defining an instance of a core process model, including defining extension points for the instance. In some implementations, the process extension modeler 1600 can be used to provide the user interface for extending core process models. From 1902, method 1900 proceeds to 1904.

At 1904, selections of the extension points and customization of extensions associated with the extension points are received from a client device. For example, the user can use controls in the process extension modeler 1600 to select an extension point and provide customization. From 1904, method 1900 proceeds to 1906.

At 1906, a core process model instance including the core process model and customizations of the extensions are stored at the server and in a repository of core process model instances. As an example, once the user has completed definition of a core process model, including extensions, the instance of the core process model can be saved, e.g., in the reference process repository 112. From 1906, method 1900 proceeds to 1908.

At 1908, information is provided for use at the client device for presenting a process extension query interface. For example, the process extension query API 107 can provide information needed to enter a core process model extension query using the JAVA query API 804. From 1908, method 1900 proceeds to 1910.

At 1910, a query is received from the client device. As an example, the user-entered query 802 can be received through the JAVA query API 804, e.g., through the SPARQL query layer 108. From 1910, method 1900 proceeds to 1912. The query can be formulated, for example, using a process extension query language that supports a specification of queries on extension points of core process models and extensions plugged into the core process models, as described above. Complexities of the query can be hidden and abstracted, for example, using an application programming interface (API) (e.g., the JAVA query API 804) that allows a consumer to formulate the query based on an API. The method 1900 can further include using the API to automatically generate a SPARQL query, e.g., through the SPARQL query layer 108, to be processed by an ontology reasoning engine.

At 1912, query results including information associated with extension points matching the query are identified at the server and from the repository. For example, the reference process repository 112 can identify reference point information that is responsive to the query 802. From 1912, method 1900 proceeds to 1914.

At 1914, the query results are provided for presentation in the process extension query interface. For example, query results 808 can be displayed in the JAVA query API 804, e.g., through the SPARQL query layer 108. After 1914, method 1900 typically stops.

In some implementations, the method 1900 further includes steps for using process extension patterns. For example, information associated with process extension patterns 118 can be provided by the server and with the information for the core process model user interface, for presentation in the core process model user interface, wherein the process extension patterns are available from an extendable library in which individual process extension patterns can be added or deleted. A selection of a particular process extension pattern from the process extension patterns can be received from the client device, e.g., one of the extensions 1000, 1110, 1200, 1300, 1400, or 1500. The selected particular process extension pattern can be incorporated into the core process model instance before the storing, e.g., by the process extension modeling environment.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
providing, by a server and from a core process model meta-model stored at the server, information for a core process model user interface on a client device initiating display of a core process model as a visualization that identifies steps of the core process model and presents dedicated extension points for inserting, into the core process model, user-defined extensions;
receiving, from a client device, selections of the extension points and customization of extensions associated with the extension points;
developing a process extension pattern which describes frequently observed interaction patterns between a core process and extensions made to the core process and is based on an analysis of combinations of the core process and the received selections of the extension points;
incorporating the developed process extension pattern into the core process meta-model;
storing, at the server and in a repository of core process model instances, a core process model instance including the core process model and customizations of the extensions and the developed process extension pattern;

providing information for use at the client device for presenting a process extension query interface;

receiving a query from the client device;

identifying, at the server and from the repository, query results including information associated with extension points matching the query; and providing the query results for presentation in the process extension query interface.

2. The method of claim 1, further comprising:

providing, by the server and with the information for the core process model user interface, information associated with process extension patterns for presentation in the core process model user interface, wherein the process extension patterns are available from an extendable library in which individual process extension patterns can be added or deleted;

receiving, from the client device, a selection of a particular process extension pattern from the process extension patterns; and incorporating the selected particular process extension pattern into the core process model instance before the storing.

3. The method of claim 1, further comprising:

converting the received query into a generated query of another format; and providing the generated query for presentation in the core process model user interface.

4. The method of claim 1, wherein the query is formulated using a process extension query language that supports a specification of queries on extension points of core process models and extensions plugged into the core process models.

5. The method of claim 4, wherein a complexity of the query is hidden and abstracted using an application programming interface (API) that allows a consumer to formulate the query based on an API, and wherein the method further comprises using the API to automatically generate a Structured Protocol and Resource Description Framework (RDF) Query Language (SPARQL) query to be processed by an ontology reasoning engine.

6. A system comprising:

memory storing:

data stores including information about core process models and associated extension points; and an application for providing instructions including:

providing, by a server and from a core process model meta-model stored at the server, information for a core process model user interface on a client device initiating display of a core process model as a visualization that identifies steps of the core process model and presents dedicated extension points for inserting, into the core process model, user-defined extensions;

receiving, from a client device, selections of the extension points and customization of extensions associated with the extension points;

developing a process extension pattern which describes frequently observed interaction patterns between a core process and extensions made to the core process and is based on an analysis of combinations of the core process and the received selections of the extension points;

incorporating the developed process extension pattern into the core process meta-model;

storing, at the server and in a repository of core process model instances, a core process model instance including the core process model and customizations of the extensions and the developed process extension pattern;

providing information for use at the client device for presenting a process extension query interface;

receiving a query from the client device;

identifying, at the server and from the repository, query results including information associated with extension points matching the query; and providing the query results for presentation in the process extension query interface.

7. The system of claim 6, the instructions further comprising:

providing, by the server and with the information for the core process model user interface, information associated with process extension patterns for presentation in the core process model user interface, wherein the process extension patterns are available from an extendable library in which individual process extension patterns can be added or deleted;

receiving, from the client device, a selection of a particular process extension pattern from the process extension patterns; and incorporating the selected particular process extension pattern into the core process model instance before the storing.

8. The system of claim 6, further comprising:

converting the received query into a generated query of another format; and providing the generated query for presentation in the core process model user interface.

9. The system of claim 6, wherein the query is formulated using a process extension query language that supports a specification of queries on extension points of core process models and extensions plugged into the core process models.

10. The system of claim 9, wherein a complexity of the query is hidden and abstracted using an application programming interface (API) that allows a consumer to formulate the query based on an API, and wherein the further comprises using the API to automatically generate a Structured Protocol and Resource Description Framework (RDF) Query Language (SPARQL) query to be processed by an ontology reasoning engine.

11. A computer-readable media, the computer-readable media comprising computer-readable instructions embodied on tangible, non-transitory media, the instructions operable when executed by at least one computer to:

providing, by a server and from a core process model meta-model stored at the server, information for a core process model user interface on a client device initiating display of a core process model as a visualization that identifies steps of the core process model and presents dedicated extension points for inserting, into the core process model, user-defined extensions;

receiving, from a client device, selections of the extension points and customization of extensions associated with the extension points;

developing a process extension pattern which describes frequently observed interaction patterns between a core process and extensions made to the core process and is based on an analysis of combinations of the core process and the received selections of the extension points;

incorporating the developed process extension pattern into the core process meta-model;

storing, at the server and in a repository of core process model instances, a core process model instance including the core process model and customizations of the extensions and the developed process extension pattern;

providing information for use at the client device for presenting a process extension query interface;

receiving a query from the client device;

identifying, at the server and from the repository, query results including information associated with extension points matching the query; and providing the query results for presentation in the process extension query interface.

12. The computer-readable media of claim 11, the instructions further comprising:

providing, by the server and with the information for the core process model user interface, information associated with process extension patterns for presentation in the core process model user interface, wherein the process extension patterns are available from an extendable library in which individual process extension patterns can be added or deleted;

receiving, from the client device, a selection of a particular process extension pattern from the process extension patterns; and incorporating the selected particular process extension pattern into the core process model instance before the storing.

13. The computer-readable media of claim 11, further comprising:

converting the received query into a generated query of another format; and providing the generated query for presentation in the core process model user interface.

14. The computer-readable media of claim 11, wherein the query is formulated using a process extension query language that supports a specification of queries on extension points of core process models and extensions plugged into the core process models.

15. The computer-readable media of claim 14, wherein a complexity of the query is hidden and abstracted using an application programming interface (API) that allows a consumer to formulate the query based on an API, and wherein the instructions further comprises using the API to automatically generate a Structured Protocol and Resource Description Framework (RDF) Query Language (SPARQL) query to be processed by an ontology reasoning engine.

* * * * *